United States Patent
Solovykh et al.

(10) Patent No.: US 11,915,342 B2
(45) Date of Patent: Feb. 27, 2024

(54) SYSTEMS AND METHODS FOR CREATING A 2D FILM FROM IMMERSIVE CONTENT

(71) Applicant: Baobab Studios Inc., Redwood City, CA (US)

(72) Inventors: Mikhail Stanislavovich Solovykh, Redwood City, CA (US); Wei Wang, Redwood City, CA (US); Nathaniel Christopher Dirksen, Redwood City, CA (US); Lawrence David Cutler, San Francisco, CA (US); Apostolos Lerios, Austin, TX (US)

(73) Assignee: Baobab Studios Inc., Redwood City, CA (US)

( * ) Notice: Subject to any disclaimer, the term of this patent is extended or adjusted under 35 U.S.C. 154(b) by 0 days.

(21) Appl. No.: 17/866,183

(22) Filed: Jul. 15, 2022

(65) Prior Publication Data
US 2023/0005192 A1    Jan. 5, 2023

Related U.S. Application Data

(63) Continuation of application No. 17/078,062, filed on Oct. 22, 2020, now Pat. No. 11,403,787.

(60) Provisional application No. 62/925,710, filed on Oct. 24, 2019.

(51) Int. Cl.
*G06T 11/00* (2006.01)
*G06T 13/80* (2011.01)
(Continued)

(52) U.S. Cl.
CPC ............ *G06T 11/00* (2013.01); *G06T 3/0037* (2013.01); *G06T 13/80* (2013.01); *H04N 5/2224* (2013.01);
(Continued)

(58) Field of Classification Search
CPC ....... G06T 11/00; G06T 3/0037; G06T 13/20; G06T 13/80; G06T 19/006;
(Continued)

(56) References Cited

U.S. PATENT DOCUMENTS 8,591,332 B1    11/2013  Bright et al.
10,484,824 B1   11/2019  Gaeta et al.
(Continued)

FOREIGN PATENT DOCUMENTS

WO    WO 2015142732 A1 *  9/2015    ............... G06K 9/00

OTHER PUBLICATIONS

International Patent Application No. PCT/US2020/057158, International Search Report and Written Opinion dated Jan. 29, 2021, 6 pages.
(Continued)

*Primary Examiner* — Daniel F Hajnik
(74) *Attorney, Agent, or Firm* — Sheppard Mullin Richter & Hampton LLP

(57) ABSTRACT

Systems, methods, and non-transitory computer-readable media can obtain data associated with a computer-based experience. The computer-based experience can be based on interactive real-time technology. At least one virtual camera can be configured within the computer-based experience in a real-time engine. Data associated with an edit cut of the computer-based experience can be obtained based on content captured by the at least one virtual camera. A plurality of shots that correspond to two-dimensional content can be generated from the edit cut of the computer-based experience in the real-time engine. Data associated with a two-dimensional version of the computer-based experience can be generated with the real-time engine based on the plurality of shots. The two-dimensional version can be rendered based on the generated data.

20 Claims, 20 Drawing Sheets

(51) Int. Cl.
*H04N 5/222* (2006.01)
*G06T 3/00* (2006.01)
*H04N 21/81* (2011.01)
*H04N 21/854* (2011.01)
*H04N 21/2343* (2011.01)
*G11B 27/02* (2006.01)

(52) U.S. Cl.
CPC ... *H04N 21/234336* (2013.01); *H04N 21/816* (2013.01); *H04N 21/8146* (2013.01); *H04N 21/854* (2013.01); *G06T 2200/24* (2013.01); *G06T 2213/08* (2013.01); *G11B 27/02* (2013.01)

(58) Field of Classification Search
CPC ............ G06T 2200/24; G06T 2213/08; H04N 5/2224; H04N 21/234336; H04N 21/8146; H04N 21/816; H04N 21/854; H04N 23/55; G11B 27/02; G11B 27/031; G11B 27/34
See application file for complete search history.

(56) References Cited

U.S. PATENT DOCUMENTS

| | | |
|---|---|---|
| 2007/0035665 A1 | 2/2007 | Khare et al. |
| 2009/0219291 A1* | 9/2009 | Lloyd ..................... G06T 13/20 |
| | | 345/427 |
| 2011/0007080 A1* | 1/2011 | Anon ...................... G06T 13/00 |
| | | 345/473 |
| 2012/0092348 A1 | 4/2012 | McCutchen |
| 2012/0226983 A1 | 9/2012 | Goldenberg et al. |
| 2013/0135315 A1 | 5/2013 | Bares et al. |
| 2015/0242104 A1 | 8/2015 | Stokman et al. |
| 2015/0321103 A1 | 11/2015 | Barnett et al. |
| 2016/0227262 A1 | 8/2016 | Grant et al. |
| 2016/0353053 A1* | 12/2016 | Mori ....................... G11B 27/34 |
| 2017/0178601 A1* | 6/2017 | Bloch ........................ G09G 5/14 |
| 2018/0121069 A1 | 5/2018 | DiVerdi et al. |
| 2018/0150989 A1 | 5/2018 | Mitsui et al. |
| 2019/0066387 A1 | 2/2019 | Grossmann et al. |
| 2019/0356906 A1* | 11/2019 | Handa ................... G06T 15/205 |
| 2020/0221063 A1 | 7/2020 | Kammachi Sreedhar et al. |
| 2020/0351450 A1 | 11/2020 | Kim et al. |

OTHER PUBLICATIONS

International Patent Application No. PCT/US2020/057166, International Search Report and Written Opinion dated Jan. 29, 2021, 7 pages.
European Patent Application No. 20879811.6, Supplementary European Search Report dated Mar. 2, 2023, 8 pages.
European Patent Application No. 20879121.0, Supplementary European Search Report dated Mar. 2, 2023, 9 pages.

* cited by examiner (Example animation render with reticle and slate information)

(Example final render from real-time engine. Final renders can include slate and reticle information)

(Example contact sheet)

(Original lighting from the VR experience)

(Additional lights are added to make the characters pop out of the background and to brighten up the scene in general)

(Contact shadows are added so that the Turtle feels grounded onto the rock)

(Post processing is added to focus the viewer's attention and to make the shot cinematic)

((left). Original VR shot. (right) snow footsteps are added to ground the character in the environment)

(Original animation from the real-time experience. The characters are incorrectly looking directly at the camera)

(Modified animation. The Crow character (left) is looking at the ant character (right) while the ant character's animation hooks up smoothly with the previous shot)

SYSTEMS AND METHODS FOR CREATING A 2D FILM FROM IMMERSIVE CONTENT

CROSS-REFERENCE TO RELATED APPLICATIONS

This application is a continuation of U.S. patent application Ser. No. 17/078,062, filed on Oct. 22, 2020, and entitled "SYSTEMS AND METHODS FOR CREATING A 2D FILM FROM IMMERSIVE CONTENT", which claims priority to U.S. Provisional Patent Application No. 62/925,710, filed on Oct. 24, 2019 and entitled "SYSTEMS AND METHODS FOR CREATING A 2D FILM FROM IMMERSIVE CONTENT," all of which are incorporated in their entireties herein by reference.

FIELD OF THE INVENTION

The present technology relates to the field of digital animation. More particularly, the present technology relates to techniques for generating 2D content from AR/VR content.

BACKGROUND

Virtual Reality (VR) and Augmented Reality (AR) are new mediums for entertainment and storytelling that enable content creators to immerse viewers in ways that are not possible in other mediums. VR and AR are powerful immersive platforms to tell engaging stories with characters with which audiences can interact and empathize. A user (e.g., a viewer) is viscerally connected to the world around them. The user can be immersed, can have agency, and can look anywhere. The user can also have a role to play and can be inspired to act. Characters can acknowledge the user exists in their world and can respond to user actions in real-time. By contrast, 2D content (e.g., a movie, film, TV show) is a passive and cinematic medium that can elicit empathy with characters, but there is, of course, no interaction.

SUMMARY

Various embodiments of the present technology can include systems, methods, and non-transitory computer readable media configured to obtain data associated with a computer-based experience. The computer-based experience can be based on interactive real-time technology. At least one virtual camera can be configured within the computer-based experience in a real-time engine. Data associated with an edit cut of the computer-based experience can be obtained based on content captured by the at least one virtual camera. A plurality of shots that correspond to two-dimensional content can be generated from the edit cut of the computer-based experience in the real-time engine. Data associated with a two-dimensional version of the computer-based experience can be generated with the real-time engine based on the plurality of shots. The two-dimensional version can be rendered based on the generated data.

In an embodiment, the computer-based experience is based on immersive real-time technology.

In an embodiment, the data associated with the two-dimensional version is interactive 2D content.

In an embodiment, obtaining the data associated with the edit cut further includes importing data describing a set of edits reflected in the edit cut from non-linear video editing software and into the real-time engine.

In an embodiment, generating the plurality of shots that correspond to the two-dimensional content further includes applying additional set dressing and layout data to one or more frames associated with at least one shot included in the plurality of shots with the real-time engine; and applying lighting and one or more media effects to the one or more frames, wherein the lighting and the one or more media effects are added on top of the lighting and the one or more media effects applied to the computer-based experience in the real-time engine.

In an embodiment, generating data associated with the two-dimensional version of the computer-based experience from the real-time engine further includes generating at least one new shot for the two-dimensional version in an animation creation application, or applying one or more animation fixes to at least one shot for the two-dimensional version in the animation creation application.

In an embodiment, the systems, methods, and non-transitory computer readable media are configured to create a copy of the at least one shot prior to application of the one or more animation fixes, wherein the one or more animation fixes are applied to the copy.

In an embodiment, generating data associated with the two-dimensional version further includes rendering the two-dimensional version with the real-time engine.

In an embodiment, the rendering is performed in-editor through the real-time engine.

In an embodiment, the systems, methods, and non-transitory computer readable media are configured to determine a timeline associated with the two-dimensional version; determine a region marked to be rendered in the timeline; and render a portion of the two-dimensional version that corresponds to the region with the real-time engine.

Various embodiments of the present technology can include systems, methods, and non-transitory computer readable media configured to obtain data associated with a computer-based experience. The computer-based experience can be based on interactive real-time technology. At least one virtual camera can be configured within the computer-based experience in an animation creation application. A plurality of shots that correspond to two-dimensional content can be generated from an edit cut of content captured by the at least one virtual camera in the animation creation application. Data associated with a two-dimensional version of the computer-based experience can be generated in a real-time engine based on the plurality of shots. The two-dimensional version can be rendered based on the generated data.

In an embodiment, the systems, methods, and non-transitory computer readable media are configured to render the two-dimensional version in the real-time engine.

In an embodiment, generating the plurality of shots that correspond to the two-dimensional content further includes obtaining data associated with the edit cut of the computer-based experience from non-linear video editing software.

In an embodiment, generating the plurality of shots that correspond to the two-dimensional content further includes importing data associated with the plurality of shots generated in the animation creation application into the real-time engine.

In an embodiment, the systems, methods, and non-transitory computer readable media are configured to create a first animation layer associated with the two-dimensional version that is separate from a second animation layer associated with the computer-based experience, wherein adjustments made to a shot in the plurality of shots are applied to the first animation layer.

In an embodiment, the systems, methods, and non-transitory computer readable media are configured to create a first animation layer associated with a timeline corresponding to the two-dimensional version that is separate from a second animation layer associated with the computer-based experience, wherein adjustments made to the timeline corresponding to the two-dimensional version are applied to the first animation layer.

In an embodiment, generating the plurality of shots that correspond to the two-dimensional content further includes applying one or more animation fixes to at least one shot for the two-dimensional version in the animation creation application.

In an embodiment, applying the one or more animation fixes to at least one shot for the two-dimensional version in the animation creation application further includes creating a copy of the at least one shot prior to application of the one or more animation fixes, wherein the one or more animation fixes are applied to the copy.

In an embodiment, the systems, methods, and non-transitory computer readable media are configured to apply lighting and one or more media effects to frames associated with the computer-based experience in the real-time engine; and apply lighting and one or more media effects to frames associated with the two-dimensional version in the real-time engine, wherein the lighting and the one or more media effects to frames associated with the two-dimensional version are added on top of the lighting and the one or more media effects applied to the computer-based experience.

In an embodiment, the systems, methods, and non-transitory computer readable media are configured to apply additional set dressing and layout data to one or more frames associated with at least one shot included in the plurality of shots in the real-time engine.

Figure 1A:
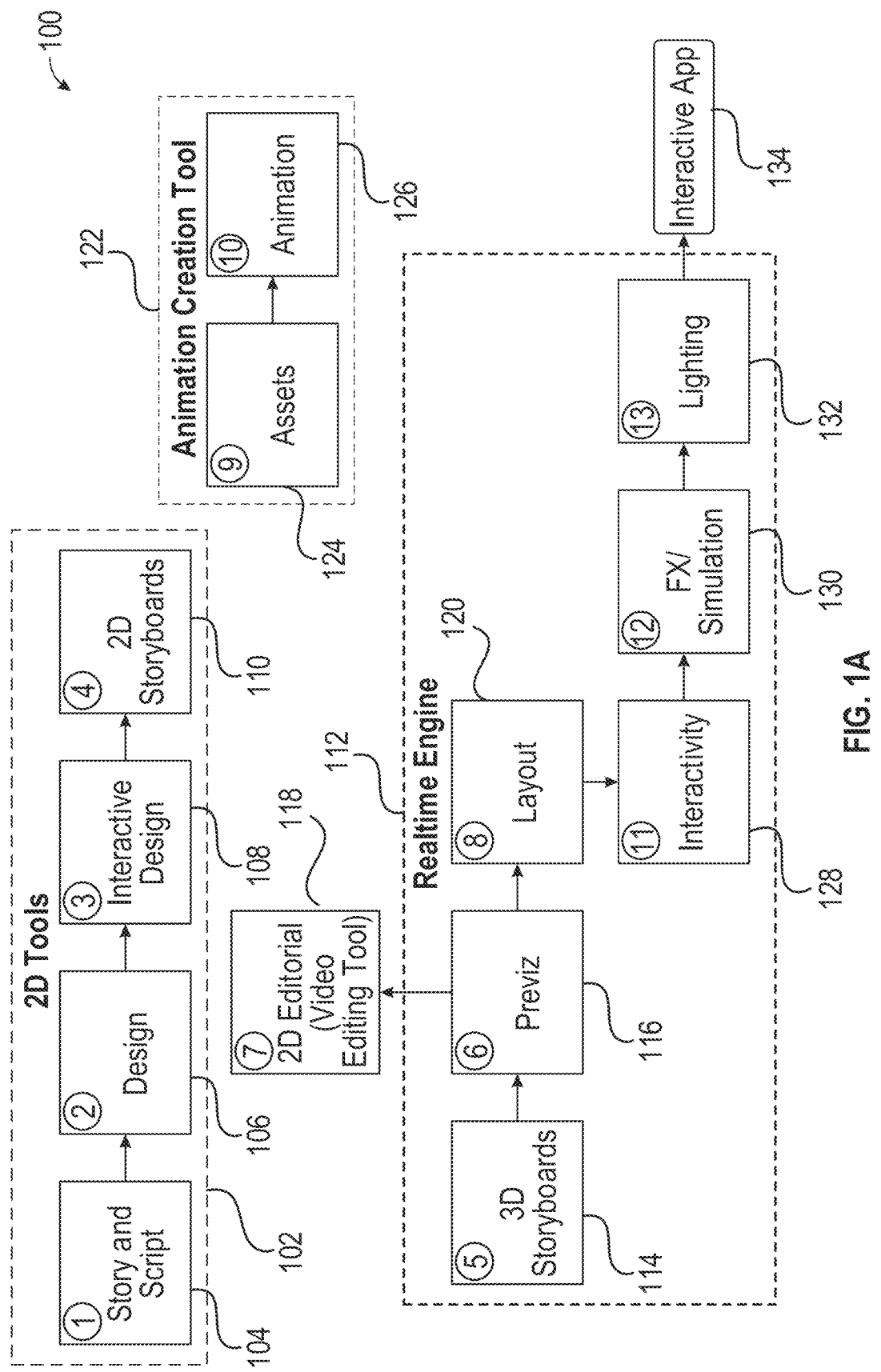
FIGS. 1A-1B illustrate conventional workflows for generating AR/VR content and 2D content.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Creating a 2D Film from Immersive Content

Virtual Reality (VR) and Augmented Reality (AR) are new mediums for entertainment and storytelling that enable content creators to immerse viewers in ways that are not possible in other mediums. VR and AR are powerful real-time immersive platforms to tell engaging stories with characters with which audiences can interact and empathize. A user (e.g., a viewer) is viscerally connected to the world around them. The user can be immersed, can have agency, and can look anywhere. The user can also have a role to play and can be inspired to act. Characters can acknowledge the user exists in their world and can respond to user actions in real-time. By contrast, 2D content (e.g., a movie, film, TV show) is a passive and cinematic medium that can elicit empathy with characters, but there is typically no interaction. More recently, interactive 2D content (e.g., Interactive TV shows) allows users to make choices at specific moments in a story which then branch into alternate 2D storylines and alternate 2D content for each branch of the narrative.

A storytelling project may rely on a traditional computer-animated movie pipeline (or process) to produce 2D content for a non-interactive medium, such as movies or TV. Further, a storytelling project may rely on an interactive real-time pipeline (or process) to produce AR/VR content for an interactive medium, such as a computer-animated real-time experience based on VR or AR technology. A storytelling project may rely on an interactive real-time pipeline (or process) to produce interactive game content, such as a computer-animated real-time experience based on mobile, console, or PC technology. Sometimes, a storytelling project can require content to be produced for both interactive and non-interactive mediums. For example, the storytelling project can require an interactive version of a story for viewers that prefer an immersive experience based on VR or AR technology and a non-interactive version of the story for viewers that prefer a traditional 2D movie experience. Under conventional approaches, the AR/VR version will be created based on the interactive real-time process and the 2D version will be created separately based on the traditional computer-animated movie process, as discussed in relation to FIGS. 1A and 1B.

FIG. 1A illustrates an example conventional interactive real-time pipeline 100 for creating AR/VR content for a story. As shown, the interactive real-time pipeline 100 begins with concept development using various two-dimensional (2D) tools 102. Initially, at block 104, a story and script can be created for interactive content, such as an interactive story or game. The story and script may consider the role of a user (or viewer), interactive mechanics, and non-linearity. For example, there may be alternate dialogue lines based on user choice. At block 106, as the story is refined, concept artwork can be created. Environmental concept art and character designs can be created to explore the world and the characters of the story. At block 108, the ways in which the user interacts with the characters, the story, and the environment may be designed. For example, this can involve designing the core mechanic, interactive elements, and non-linear story flow. At block 110, the script can be translated into 2D storyboard drawings that visually bring scenes to life. The 2D storyboards are first pitched to the director, iterated on, and then edited into a video story reel. The 2D storyboards provide a quick and cheap way to watch the entire film doing no more expensive production work. At block 114, the real-time engine 112 generates 3D storyboards based on the 2D storyboards produced by the 2D tools 102. Storyboards can be created in 3D so they can be placed and viewed in a three-dimensional environment. 3D storyboards can be created as 2D sprites that are moved around in 3D space or drawn directly in 3D in the real-time engine 112, in other 3D drawing/storyboarding tools, or in VR drawing/storyboarding tools. Next, at block 116, previz can be done in the real-time engine 112 to visualize scenes before going into animation production. At block 118, editorial will add dialogue, music, audio, and edit shot sequences for timing. In some cases, a movie edit may not be generated since the content changes based on user input. At block 120, set dressing, final environment models, and final characters can be incorporated into the scenes. At block 124, an animation creation tool 122 is used to create all the character and environment assets. At block 126, scenes and shots can be animated. In interactive games and AR/VR content, one shot typically represents one character action (called an animation cycle or cycle animation). At block 128, the real-time engine 112 can combine and/or procedurally generate animation through non-linear animation frameworks, AI systems, and other procedural methods. At block 130, the real-time engine 112 can create FX and simulation elements. At block 132, the real-time engine 112 can apply lighting effects to the animation in real-time. This is often achieved through a few dynamic lights calculated in real-time on dynamic, non-static elements (i.e. characters) of the scene combined with pre-baked global illumination calculated for static elements (i.e. non-moving parts of the environment) in the scene. At block 134, the real-time engine 112 outputs an interactive application. The interactive application may be a computer-animated real-time experience based on VR or AR technology or an interactive game.

Figure 1B:
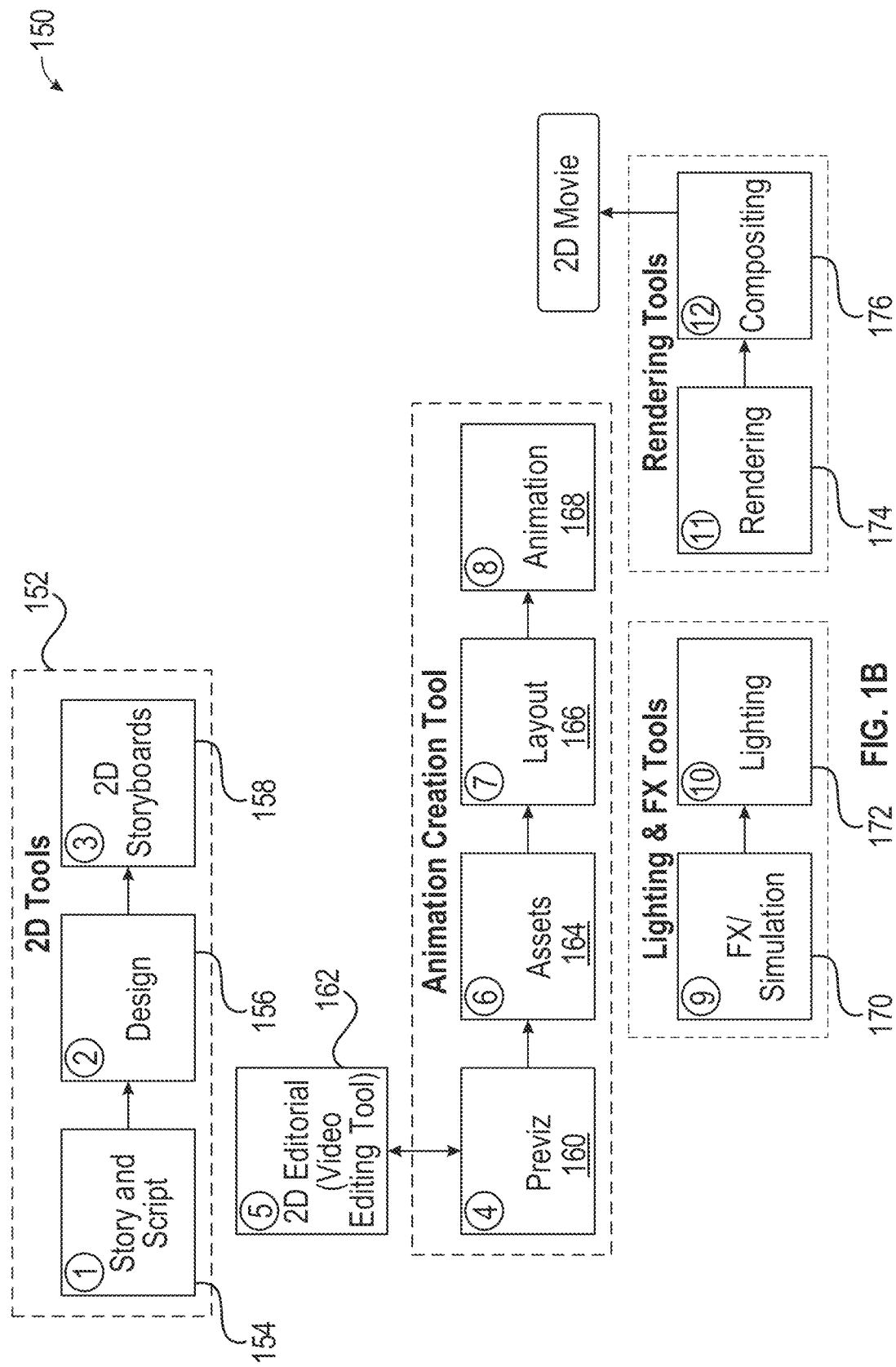

FIG. 1B illustrates an example conventional computer-animated movie pipeline 150 for creating non-interactive 2D content (e.g., a 2D computer-animated movie). As shown, the computer-animated movie pipeline 150 begins with concept development using various two-dimensional (2D) tools 152. At block 154, a story can be created for the 2D computer-animated movie. The story can be used to create a screenplay or script. At block 156, as the story is refined, concept artwork can be created to define the look of the movie. Environmental concept art and character designs can be created to explore the world and the characters of the story. At block 158, the script can be translated into 2D storyboard drawings that visually bring the scenes to life. The 2D storyboards are first pitched to the director, iterated on, and then edited into a video story reel. The 2D storyboards provide a quick and cheap way to watch the entire film without doing any more expensive production work. At block 160, previz artists translate the storyboard reels into 3D pre-visualizations of sequences. The previz artists create mocks of environment models and characters models. Then artists can place virtual cameras in scenes to establish cinematography and provide editorial footage to cut shots together. At block 162, the editor may create an edit cut in non-linear video editing software that combines the camera shots into a single sequence movie. This edit cut can be reviewed by the director, which often requires adjustments to existing cameras and and/or additional cameras to be created by the previz artist. At block 164, the characters and environments can be translated into final 3D models with textures. Character assets are rigged as digital puppets so animators can make these characters move and emote in a believable way. At block 166, final shots are created, camera cinematography is refined, and set dressing is adjusted per shot. At block 168, the animation can be broken up into a series of shots or scenes. For a given shot, either an animator will hand-animate or keyframe characters over time or the animation may be motion captured from an actor's live performance. At block 170, FX elements (e.g., water, fire, fog, etc.) can be added to shots. Further, clothing, hair, and other dynamic components are simulated. These elements rarely are applied in real-time. At block 172, lighting artists may apply virtual lights to shots to create final images of the movie. Master lighting often is first done to establish the appearance for an entire scene and/or for a smaller number of key shots. Shot lighting can then be applied to fine-tune lighting on characters and environments on a per-shot basis. At block 174, scene data can be rendered with an offline, non-real-time renderer. Rendering can occur at an artist's desk or on render farm machines either on-premise or in the cloud. Rendering often generates multiple render layer passes (e.g., depth pass, matte pass, etc.) per frame for a compositing package. At block 176, final combined render frames can be generated using compositing software to produce the non-interactive 2D content.

Thus, under conventional approaches, an entity will need to use an interactive real-time process, such as the process illustrated in FIG. 1A, to create an AR/VR version of a story. Further, under conventional approaches, the entity will need to use a separate computer-animated movie process, such as the process illustrated in FIG. 1B, to create a 2D version of the story. The need for different processes to generate interactive and non-interactive versions of the same story can cause duplicative work, increased costs, and increased production complexity.

An improved approach rooted in computer technology overcomes the foregoing and other disadvantages associated with conventional approaches specifically arising in the realm of computer technology. The present technology provides the ability to create interactive and non-interactive versions of a story based on a single process (or pipeline). The present technology allows non-interactive 2D content for a story to be generated from an existing interactive AR/VR version of the story. For example, the present technology allows a 2D computer-animated movie to be generated from an existing computer-animated real-time experience based on VR or AR technology. As a result, the present technology provides a comprehensive toolset that can enable filmmakers to meticulously craft a 2D computer-animated movie without compromising features available in conventional processes. The present technology also enables simultaneous development of both 2D- and AR/VR-based projects where changes to the AR/VR-based project can be propagated to the 2D-based project and vice-versa. The present technology can also utilize AR/VR as a content creation medium for developing the cinematography and look for a 2D project. The present technology can also handle different pipeline architectures. More details relating to the present technology are provided below.

Figure 2:
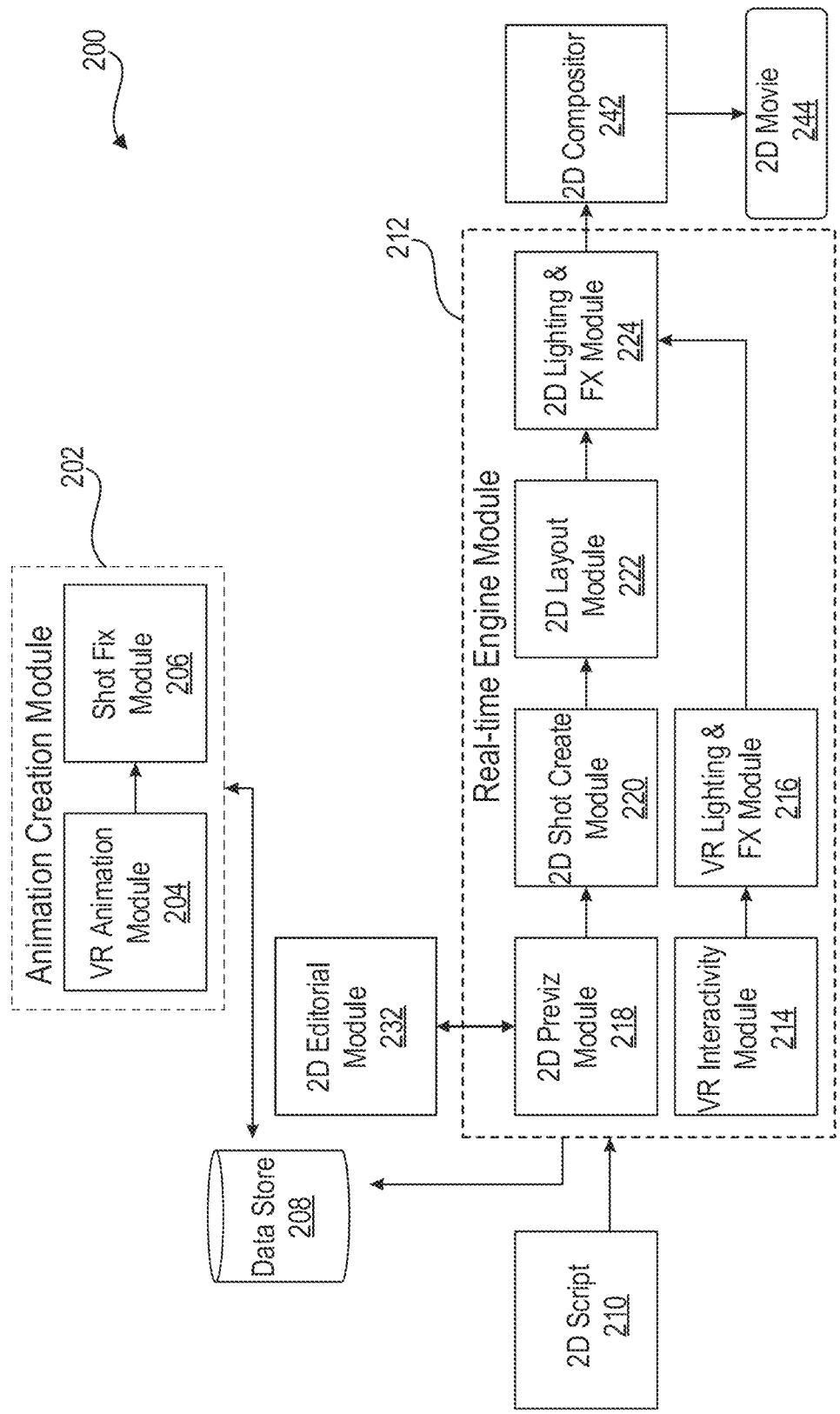
FIG. 2 illustrates an example system for generating 2D content, according to an embodiment of the present technology.

FIG. 2 illustrates an example system 200, according to an embodiment of the present technology. The example system 200 can include an animation creation module 202, a real-time engine module (or real-time engine) 212, and a 2D editorial module 232. The example system 200 can be implemented to generate non-interactive 2D content from AR/VR content. The example system 200 can be implemented to generate non-interactive 2D content from interactive game content developed for mobile, console, and PC technology. For example, the example system 200 can generate a non-interactive 2D computer-animated film or TV show from an interactive computer-animated real-time experience based on VR or AR technology. In another example, the example system 200 can generate a first-person 2D computer-animated film or TV show from a character-based computer-animated real-time experience based on VR or AR technology. The character-based computer-animated real-time experience may involve an immersive experience in which a viewer can participate in a story as a character. In another example, the example system 200 can generate an interactive 2D computer-animated film or TV show from a character-based computer-animated real-time experience based on VR or AR technology. The example system 200 will generate a set of 2D content paths representing different branches of the story. Many variations are possible. In contrast to the example system 400 of FIG. 4 that is discussed in more detail herein, the example system 200 allows camera placement and shot creation to occur in relation to the real-time engine module 212 instead of the animation creation module 202. The example system 200 can be well-suited for interactive AR/VR content where the final real-time content is procedurally generated from a set of animation clips created based on the animation creation module 202. The animation creation module 202, the real-time engine module 212, and the 2D editorial module 232 can be implemented in one or more software applications running on one or more computing devices. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the animation creation module 202, the real-time engine module 212, and the 2D editorial module 232 can be implemented in any suitable sequences and combinations.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities. In an example embodiment, the animation creation module 202 can be implemented in or with animation creation software, such as Autodesk© Maya, and the real-time engine module 212 can be implemented in or with a real-time engine, such as the Unity® game engine.

The animation creation module 202 can include a VR animation module 204 and a shot fix module 206.

The VR animation module 204 can be configured to animate an interactive version of a story. For example, the interactive version of the story can be a computer-animated real-time experience based on VR or AR technology. The interactive version of the story can be composed of sequences of shots. A shot can represent a number of frames captured by a virtual camera positioned within the computer-animated real-time experience in three-dimensional space. In some embodiments, a shot can represent a single character action, such as an animation cycle or cycle animation. Further, a sequence of shots can correspond to a number of related shots. For instance, a sequence can include shots captured at a particular location within the computer-animated real-time experience. The VR animation module 204 can store data associated with the interactive version of the story (e.g., shots, sequences of shots, etc.) in a data store 208. In one embodiment, the data store 208 resides on a remote server. In another embodiment, a web-based application interfaces with various modules in the animation creation module 202, the real-time engine module 212, and the 2D editorial module 232 to synchronize the data in the data store 208.

The shot fix module 206 can be configured to apply various fixes to shots associated with a non-interactive 2D version of the story generated from the interactive version of the story. For example, the shot fix module 206 can apply fixes to shots generated for the non-interactive 2D version of the story by the real-time engine module 212. In general, shots associated with the non-interactive 2D version of the story can be derived from shots associated with the interactive version of the story. As a result, updates to a shot associated with the interactive version of the story may propagate to a corresponding shot associated with the non-interactive 2D version of the story. In some instances, specific adjustments that apply only to shots associated with the non-interactive 2D version of the story may be required. For example, character eyelines represented in a shot may be correct in the interactive version of the story but may appear to look in the wrong direction in a shot associated with the non-interactive 2D version of the story. In such instances, the shot fix module 206 can be configured to bi-furcate shots that require specific adjustments to the non-interactive 2D version of the story. When a shot is bi-furcated, separate copies of the shot are maintained for the interactive version and the non-interactive 2D version. As a result, adjustments to the shot can be made to the non-interactive 2D version of the story without affecting the interactive version of the story. In the foregoing example, adjustments can be made to character eyelines in shots associated with the non-interactive 2D version of the story without affecting the character eyelines in corresponding shots associated with the interactive version of the story. In some instances, the non-interactive version of the story may require new shots to be created. In one example, one shot in the interactive version of the story will be split into a number of smaller and potentially overlapping shots in the non-interactive 2D version which correspond to different camera angles (e.g. for close-ups, medium shots, and establishing shots). These new shots may correspond to computer-animation that is created specifically for the non-interactive 2D version. For example, a visual quality associated with a character may not be acceptable in a shot associated with the non-interactive 2D version of the story. In another example, a shot associated with the interactive version of the story can involve some interaction by a viewer. While such interaction is permissible in the interactive version of the story, the interaction is not suitable for reproduction in the non-interactive 2D version of the story. In such instances, the shot fix module 206 can permit creation of new shots for the non-interactive 2D version of the story which revise or replace existing shots associated with the interactive version of the story. The shot fix module 206 can store data associated with shots fixed or added in relation to the non-interactive 2D version of the story in the data store 208.

The real-time engine module 212 can include a VR interactivity module 214, a VR lighting & FX module 216, a 2D previz module 218, a 2D shot create module 220, a 2D layout module 222, and a 2D lighting & FX module 224.

The VR interactivity module 214 can be configured to combine and/or procedurally generate animation using non-linear animation frameworks, artificial intelligence (AI) systems, and other generally known procedural methods.

The VR lighting and FX module 216 can be configured to apply lighting and media effects (FX) elements used in the interactive version of the story. The lighting and FX elements can be created using generally known techniques.

The 2D previz module 218 can be configured to position a set of virtual cameras in the interactive version of the story as animated by the VR animation module 204. For example, an artist may instruct the 2D previz module 218 to position the set of virtual cameras in the interactive version of the story based on a 2D film script 210. For example, the 2D film script 210 can be written based on a script associated with the interactive version of the story. The set of virtual cameras can be placed within the interactive version of the story to capture animation footage from a variety of different camera angles. In some embodiments, the set of virtual cameras and their associated parameters can be created using AR/VR technology. For example, an artist can place and manipulate a virtual camera by moving a 6DOF hand controller with their hands in VR. The artist can then record footage from the original VR/AR experience with this virtual camera in VR. This can be used to create hand-held camera effects. In one embodiment, multiple artists can use VR/AR technology to place and record different virtual cameras, thus creating distinct sets of camera data. The 2D previz module 218 can also be configured to export 2D "playblast" feeds (or movies) for each virtual camera. In some embodiments, the 2D previz module 218 can insert reticle and slate information to each frame of an exported 2D "playblast" feed, as illustrated in example FIG. 6. The reticle and slate information can be provided as frame overlays. In some embodiments, the reticle and slate information can include reticle data (e.g., camera boundaries), sequence data, a filename, camera lens, camera/shot name, timestamp, take or iteration number, and animation frame number.

Figures 6, 7:
FIGS. 6-17 illustrate various interfaces and related outputs, according to embodiments of the present technology.

The 2D shot create module 220 can be configured to create new shots and update existing shots. In general, the 2D shot create module 220 can create shots from an edit cut. The edit cut can be produced by the 2D editorial module 232, as discussed below. In one embodiment, every virtual camera represents a single shot. In another embodiment, multiple shots may be constructed from a single virtual camera. The 2D shot create module 220 can store each shot and its related metadata information in the data store 208. An example of shot metadata information associated with a virtual (or animation) camera is illustrated in FIG. 7. For example, the shot metadata information can include a shot name, duration, animation file, frame range, characters included in a shot, and a publish version. Many variations are possible. In one embodiment, the 2D shot create module 220 can update a shared file that stores shot data. In one embodiment, the 2D shot create module 220 updates the data store 208. In another embodiment, the 2D shot create module 220 updates the data store 208 through the web application API (application programming interface).

The 2D layout module 222 can be configured to enhance shots created by the 2D shot create module 220. For example, the 2D layout module 222 can apply additional set dressing and layout on a per-shot basis using generally known approaches.

The 2D lighting & FX module 224 can be configured to provide various options to apply features to shots. For example, the 2D lighting & FX module 224 can apply lights; shadows; contact shadows; FX elements; and post-processing effects, such as motion blur and depth of field. These features can be applied based on instructions from lighting and FX artists, for example. Applying such features can augment the appearance of each shot.

The 2D compositor 242 can generate final render frames based on generally known approaches. For example, the 2D compositor 242 can generate the final render frames based on final frames and layer passes as rendered by the real-time engine module 212. The 2D compositor 242 can also generate the non-interactive 2D version of the story, such as a 2D computer-animated movie 244, based on the final render frames.

The 2D editorial module 232 can provide information describing an edit cut that combines various camera shots into a single sequence movie. The edit cut can be produced using non-linear video editing software. Information describing the edit cut and related editorial timing and track information can be imported into the real-time engine module 212. The real-time engine module 212 permits further adjustments to existing virtual cameras and addition of new virtual cameras as needed to refine the edit cut. In some embodiments, the 2D editorial module 232 can read editing choices created by the non-linear video editing software in relation to the edit cut. The 2D editorial module 232 can recreate (or provide) the editing choices in the real-time engine module 212. In an embodiment, the 2D editorial module 232 can read the following data from the non-linear editing software project: the location of a source video and audio clips; timecodes of clips from video and audio tracks; and effects, such as cross-fade and audio level curves that can be applied to video and audio clips. In an embodiment, the 2D editorial module 232 can use such data to identify assets in the real-time engine module 212 that correspond to video and audio clips edited in the non-linear video editing software. In an embodiment, the 2D editorial module 232 can use such data to create animation tracks and audio tracks with the identified assets in the real-time engine module 212. In an embodiment, the 2D editorial module 232 can use such data to apply editing decisions to these assets in the real-time engine module 212. In an embodiment, the 2D editorial module 232 can create a single timeline that represents all shots so a user can scrub back and forth between shots in the real-time engine module 212. The single timeline can help facilitate real-time editing with the context of surrounding shots. Further, the 2D editorial module 232 supports updating existing cameras and shot information that already exists in the real-time engine module 212. In one embodiment, camera/shot tracks from non-linear video editing software are associated with tracks in the real-time engine module 212 by naming convention. In another embodiment, the tracks can be correlated by metadata information that is passed to the non-linear video editing software and then round-tripped back to the real-time engine module 212. In another embodiment, the tracks can be associated by using open source file formats, such as OpenTimeline. In yet another embodiment, tracks can be correlated using data comparison heuristics. Many variations are possible.

Figure 3A:
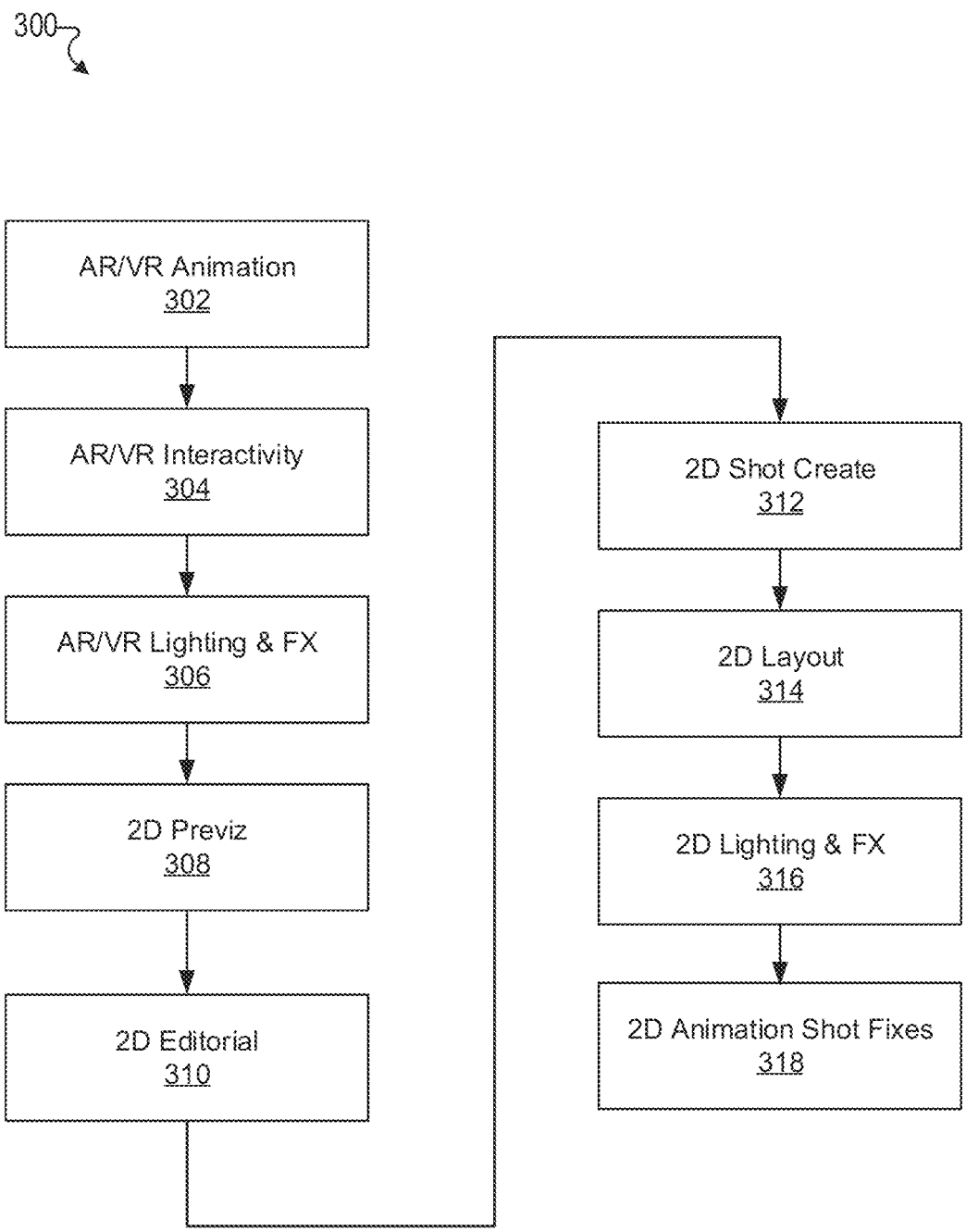
FIGS. 3A-3B illustrate example methods, according to an embodiment of the present technology.

FIG. 3A illustrates an example method 300, according to an embodiment of the present technology. In some embodiments, the method 300 can be performed by the system 200 of FIG. 2. At block 302, sequences and shots can be animated for an AR/VR animation or experience, as described above in reference to the VR animation module

204. At block 304, animation can be combined and/or procedurally generated through non-linear animation frameworks, as described above in reference to the VR interactivity module 214. At block 306, lighting and FX elements can be created for the AR/VR animation or experience, as described above in reference to the VR lighting & FX module 216. At block 308, virtual cameras can be placed in a real-time engine, as described above in reference to the 2D previz module 218. At block 310, an edit cut can be produced in non-linear video editing software, as described above in reference to the 2D editorial module 232. At block 312, once the edit cut is approved, 2D shots are created from camera and timing metadata, as described above in reference to the 2D shot create module 220. At block 314, set dressing and layouts may be applied to shots, as described above in reference to the 2D layout module 222. At block 316, additional lights, shadows, contact shadows, FX elements, and post-processing effects can be applied, as described above in reference to the 2D lighting & FX module 224. At block 318, fixes can be applied to 2D shots and additional 2D shots can be created, as described above in reference to the shot fix module 206.

Many variations to the example methods are possible. It should be appreciated that there can be additional, fewer, or alternative steps performed in similar or alternative orders, or in parallel, within the scope of the various embodiments discussed herein unless otherwise stated.

Figure 3B:
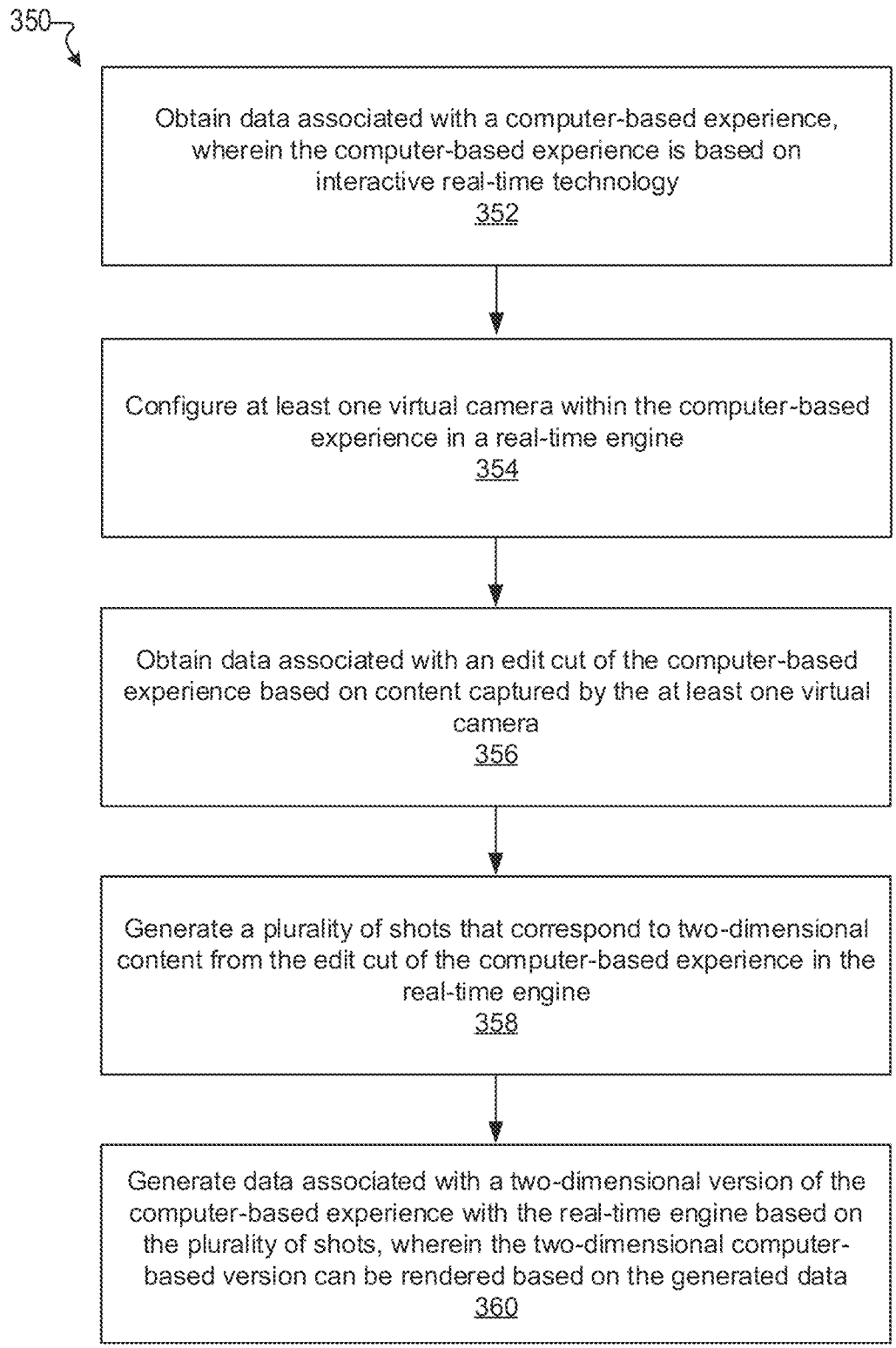

FIG. 3B illustrates an example method 350, according to an embodiment of the present technology. For example, the method 350 can be performed by the system 200 of FIG. 2. At block 352, data associated with a computer-based experience can be obtained. The computer-based experience can be based on interactive real-time technology. For example, the interactive real-time technology can apply augmented reality (AR) and/or virtual reality (VR) to provide interactive content. At block 354, at least one virtual camera can be configured within the computer-based experience in a real-time engine. At block 356, data associated with an edit cut of the computer-based experience can be obtained based on content captured by the at least one virtual camera. At block 358, a plurality of shots that correspond to two-dimensional content can be generated from the edit cut of the computer-based experience in the real-time engine. At block 360, data associated with a two-dimensional version of the computer-based experience can be generated with the real-time engine based on the plurality of shots. The two-dimensional version can be rendered based on the generated data.

Many variations to the example methods are possible. It should be appreciated that there can be additional, fewer, or alternative steps performed in similar or alternative orders, or in parallel, within the scope of the various embodiments discussed herein unless otherwise stated.

Figure 4:
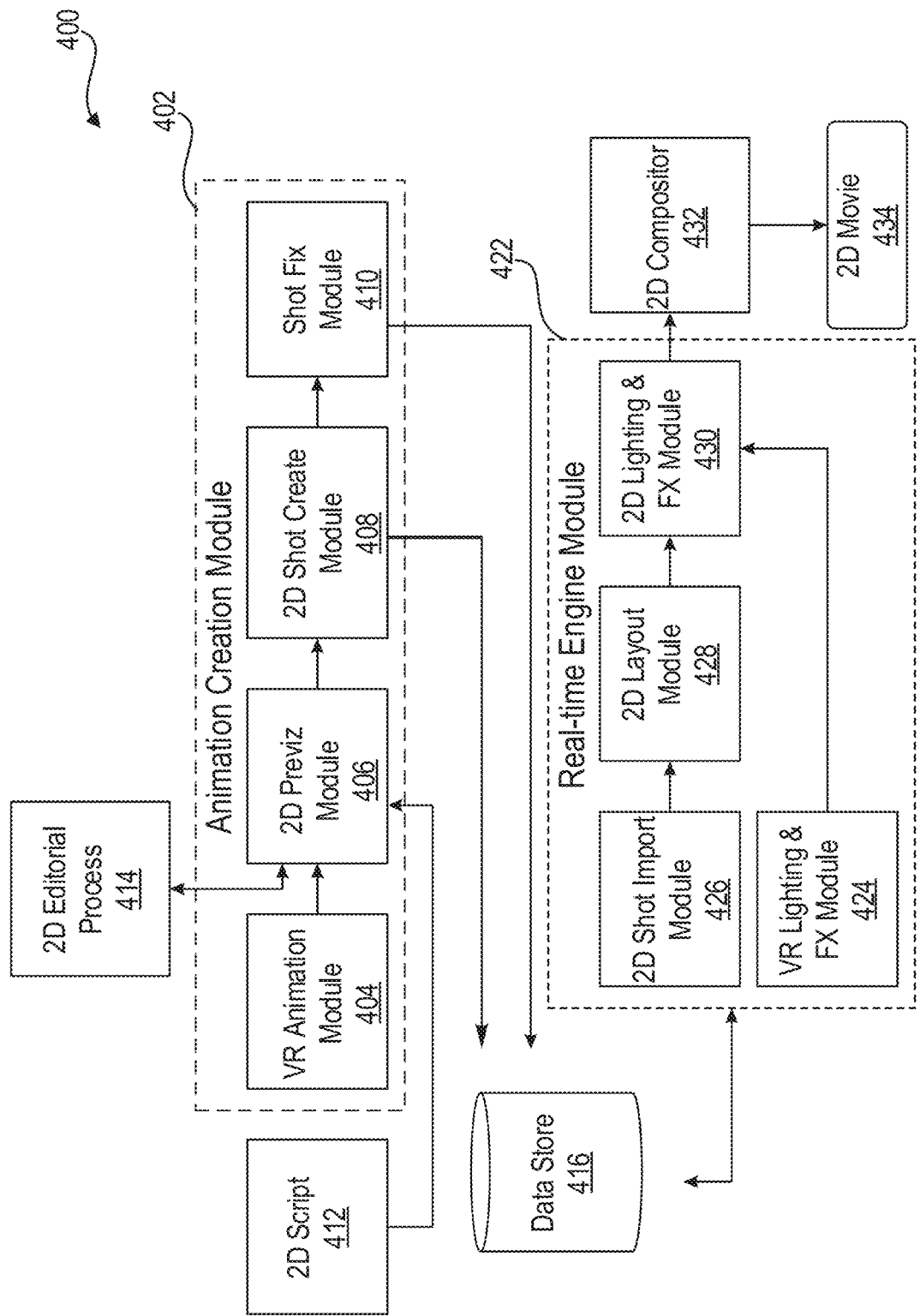
FIG. 4 illustrates another example system for generating 2D content, according to an embodiment of the present technology.

FIG. 4 illustrates an example system 400, according to an embodiment of the present technology. The example system 400 can include an animation creation module 402 and a real-time engine module (or real-time engine) 422. The example system 400 can be implemented to generate a non-interactive 2D version of a story from an interactive version of the story. For example, the example system 400 can generate a non-interactive 2D computer-animated film from an interactive computer-animated real-time experience based on VR or AR technology. In another example, the example system 400 can generate a first-person 2D computer-animated film from a character-based computer-animated real-time experience based on VR or AR technology. The character-based computer-animated real-time experience may involve an immersive experience in which a viewer can participate in a story as a character. Many variations are possible. In contrast to the example system 200 of FIG. 2, the example system 400 allows camera placement and shot creation to occur in relation to the animation creation module 402 instead of the real-time engine module 422. As such, the example system 400 can be well-suited for content that is primarily linear in nature where the straight-ahead animations in the animation creation module 402 match the animations in the real-time engine module 422. The animation creation module 402 and the real-time engine module 422 can be implemented in one or more software applications running on one or more computing devices. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the animation creation module 402 and the real-time engine module 422 can be implemented in any suitable sequences and combinations.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities. In an example embodiment, the animation creation module 402 can be implemented in or with animation creation software, such as Autodesk© Maya, and the real-time engine module 422 can be implemented in or with a real-time engine, such as the Unity® game engine.

The animation creation module 402 can include a VR animation module 404, a 2D previz module 406, a 2D shot create module 408, and a shot fix module 410.

The VR animation module 404 can be configured to animate an interactive version of a story. For example, the interactive version of the story can be a computer-animated real-time experience based on VR or AR technology. The interactive version of the story can be composed of sequences of shots. A shot can represent a number of frames captured by a virtual camera positioned within the computer-animated real-time experience in three-dimensional space. In some embodiments, a shot can represent a single character action, such as an animation cycle or cycle animation. Further, a sequence of shots can correspond to a number of related shots. For instance, a sequence can include shots that were captured at a particular location within the computer-animated real-time experience.

The 2D previz module 406 can be configured to position a set of virtual cameras in the interactive version of the story as animated by the VR animation module 404. For example, an artist may instruct the 2D previz module 406 to position the set of virtual cameras in the interactive version of the story based on a 2D film script 412. For example, the 2D film script 412 can be written based on a script associated with the interactive version of the story. The set of virtual cameras can be placed within the interactive version of the story to capture animation footage from a variety of different camera angles. The 2D previz module 406 can also be configured to export 2D "playblast" feeds (or movies) for each virtual camera. For example, the 2D previz module 406 can provide a camera recording interface that provides options to record data captured by each camera. In some embodiments, the 2D previz module 406 can insert reticle and slate information to each frame of an exported 2D "playblast" feed, as illustrated in example FIG. 6. The reticle and slate information can be provided as frame overlays. In some embodiments, the reticle and slate information can include reticle data (camera boundaries), sequence data, a filename, camera lens, camera/shot name, timestamp, take or iteration number, and animation frame number. The 2D previz module 406 can interact with a 2D editorial process 414. For example, the 2D editorial process 414 can provide an edit cut that combines various camera shots from exported "playblast" feeds into a single sequence movie. The edit cut can be produced using non-linear video editing software. The edit cut can be reviewed and, if needed, new virtual cameras can be introduced and/or further adjustments can be made to existing virtual cameras. In one embodiment, every camera represents a single shot. In another embodiment, multiple shots may be constructed from a single camera.

Figure 8:
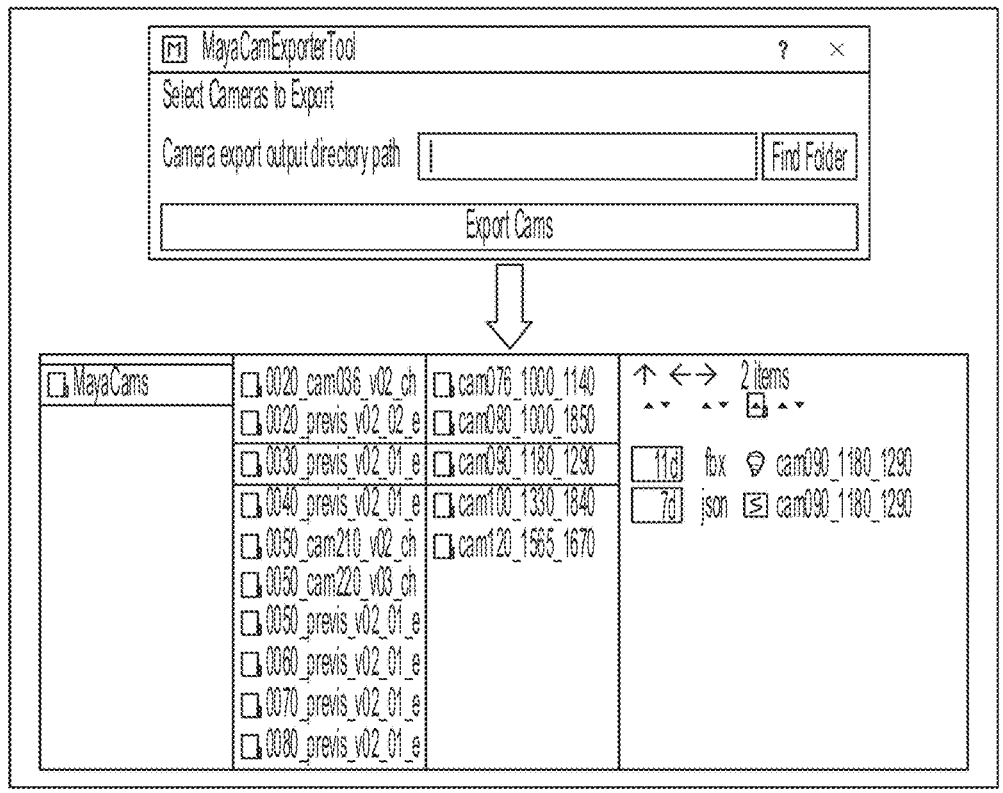

The 2D shot create module 408 can be configured to create new shots and update existing shots. In general, the 2D shot create module 408 can create shots from the edit cut provided by the 2D editorial process 414. The 2D shot create module 408 can store each shot and its related metadata information in a data store 416. An example of shot metadata information associated with a virtual (or animation) camera is illustrated in example FIG. 7. For example, the shot metadata information can include a start frame, an end frame, a production name, a sequence, version, and rendition. Many variations are possible. In one embodiment, the 2D shot create module 408 can update a shared file that stores shot data. For example, the 2D shot create module 408 can export shot data associated with one or more identified virtual cameras to a specified output location, such as the data store 416. In one embodiment, the data store 416 resides on a remote server. In another embodiment, a web-based application interfaces with various modules in the animation creation module 402, the real-time engine module 422, and the 2D editorial module 414 to synchronize the data in the data store 416. FIG. 8 illustrates an example export interface for exporting shot data. In another embodiment, the 2D shot create module 408 can update a show database accessible through the data store 416. The 2D shot create module 408 can also export virtual camera information, for example, to a file system or cloud-based storage system.

The shot fix module 410 can be configured to apply various fixes to shots associated with a non-interactive version of the story generated from the interactive version of the story. For example, the shot fix module 410 can apply fixes to shots generated for the non-interactive version of the story by the real-time engine module 422. In general, shots associated with the non-interactive version of the story can be derived from shots associated with the interactive version of the story. As a result, updates to a shot associated with the interactive version of the story may propagate to a corresponding shot associated with the non-interactive version of the story. In some instances, specific adjustments that apply only to shots associated with the non-interactive version of the story may be required. For example, character eyelines represented in a shot may be correct in the interactive version of the story but may appear to look in the wrong direction in a shot associated with the non-interactive version of the story. In such instances, the shot fix module 410 can be configured to bi-furcate shots that require specific adjustments to the non-interactive version of the story. When a shot is bi-furcated, separate copies of the shot are maintained for the interactive and non-interactive versions of the story. Adjustments to the shot can be made to the non-interactive version of the story without affecting the interactive version of the story. In the foregoing example, adjustments can be made to character eyelines in shots associated with the non-interactive version of the story without affecting the character eyelines in corresponding shots associated with the interactive version of the story. In some instances, the non-interactive version of the story may require new shots to be created. In one example, one shot in the interactive version of the story will be split into a number of smaller and potentially overlapping shots in the non-interactive 2D version which correspond to different camera angles (e.g. for close-ups, medium shots, and establishing shots). These new shots may correspond to computer-animation that is created specifically for the non-interactive version. For example, a visual quality associated with a character for an interactive version of a story may be not be acceptable in a shot associated with the non-interactive version of the story. In another example, a shot associated with the interactive version of the story can involve some interaction by a viewer. While such interaction is permissible in the interactive version of the story, the interaction is not suitable for reproduction in the non-interactive version of the story. In such instances, the shot fix module 410 can permit creation of new shots for the non-interactive version of the story which revise or replace existing shots associated with the interactive version of the story. The shot fix module 410 can store data associated with shots that were fixed or added in relation to the non-interactive version of the story in the data store 416.

The real-time engine module 422 can include a VR lighting & FX module 424, a 2D shot import module 426, a 2D layout module 428, and a 2D lighting & FX module 430.

The VR lighting & FX module 424 can be configured to apply lighting and media effects (FX) elements for the interactive version of the story. The lighting and FX elements can be created using generally known techniques.

Figure 9:
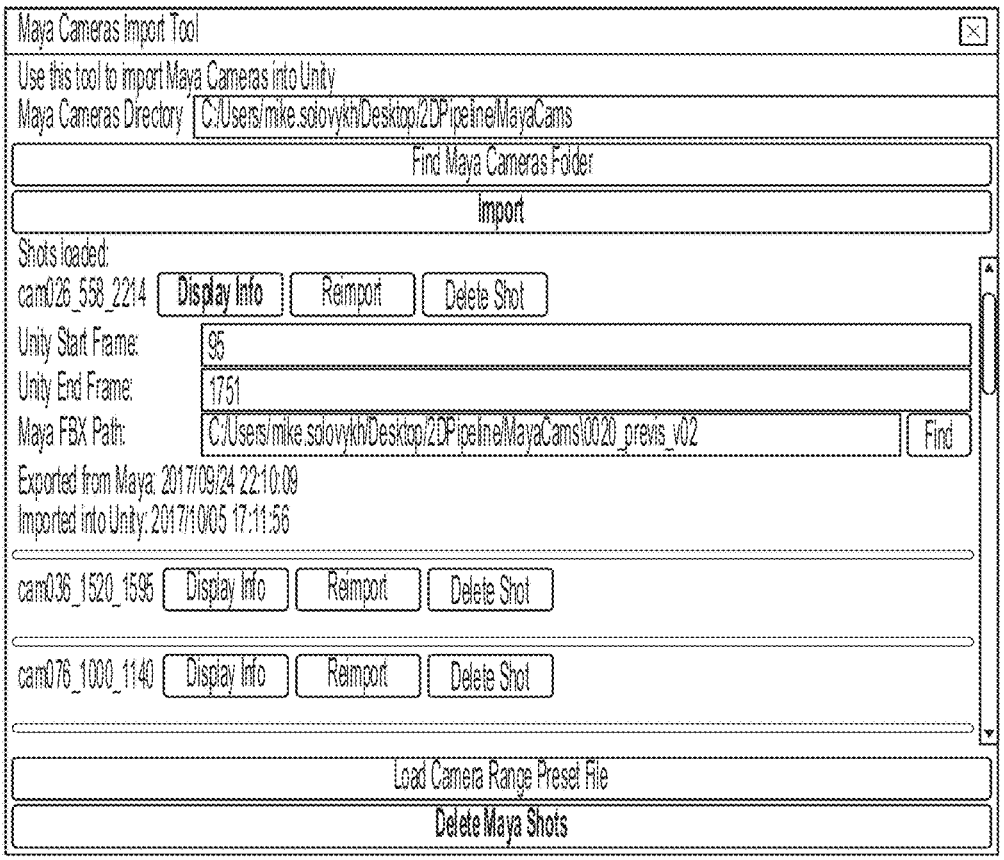

The 2D shot import module 426 can be configured to import shot data into the real-time engine module 422. For example, once the shots and cameras have been added to the data store 416 (e.g., a show database), the 2D shot import module 426 can provide an interface that provides options to import virtual camera feeds and 2D shot data into the real-time engine module 422, as illustrated in the example of FIG. 9. New shot timelines can be setup for each 2D shot the camera data is imported. For example, a directory that stores 2D shot data (e.g., virtual camera feeds) can be identified through the interface. The interface can also provide options to view shot information (e.g., frame range, path, etc.) for a given shot, reimport the shot, and delete the shot. When importing a shot, the 2D shot import module 426 can create additional 2D data for each shot. The additional 2D data can layer on top of existing AR/VR content. This enables per-shot adjustments to be made additively while using the existing AR/VR content as basis. In one embodiment, the 2D data can be represented as additional timelines that can be adjusted per department and applied on top of AR/VR content timelines.

The 2D layout module 428 can be configured to enhance shots. For example, the 2D layout module 222 can apply additional set dressing and layout on a per-shot basis.

The 2D lighting & FX module 430 can be configured to provide options to add additional features to shots. For example, the 2D lighting & FX module 430 can apply lights; shadows; contact shadows; FX elements; and post-processing effects, such as motion blur and depth of field. The additional features can be applied as instructed by lighting and FX artists, for example. Applying the additional features can augment the appearance of each shot. In one embodiment, the 2D lighting & FX module 430 represents VR content as a set of master timelines representing character animation, lighting, and FX elements. In this embodiment, the content runs primarily in linear fashion. In another embodiment, the content is non-linear and uses additional systems in addition to timelines, such as finite state machines, blend trees, and custom AI systems.

The 2D compositor 432 can generate final render frames based on generally known approaches. For example, the 2D compositor 432 can generate the final render frames based on final frames and layer passes as rendered by the real-time engine module 422. The 2D compositor 432 can also generate the non-interactive version of the story, such as a 2D computer-animated movie 434, based on the final render frames.

Figure 5A:
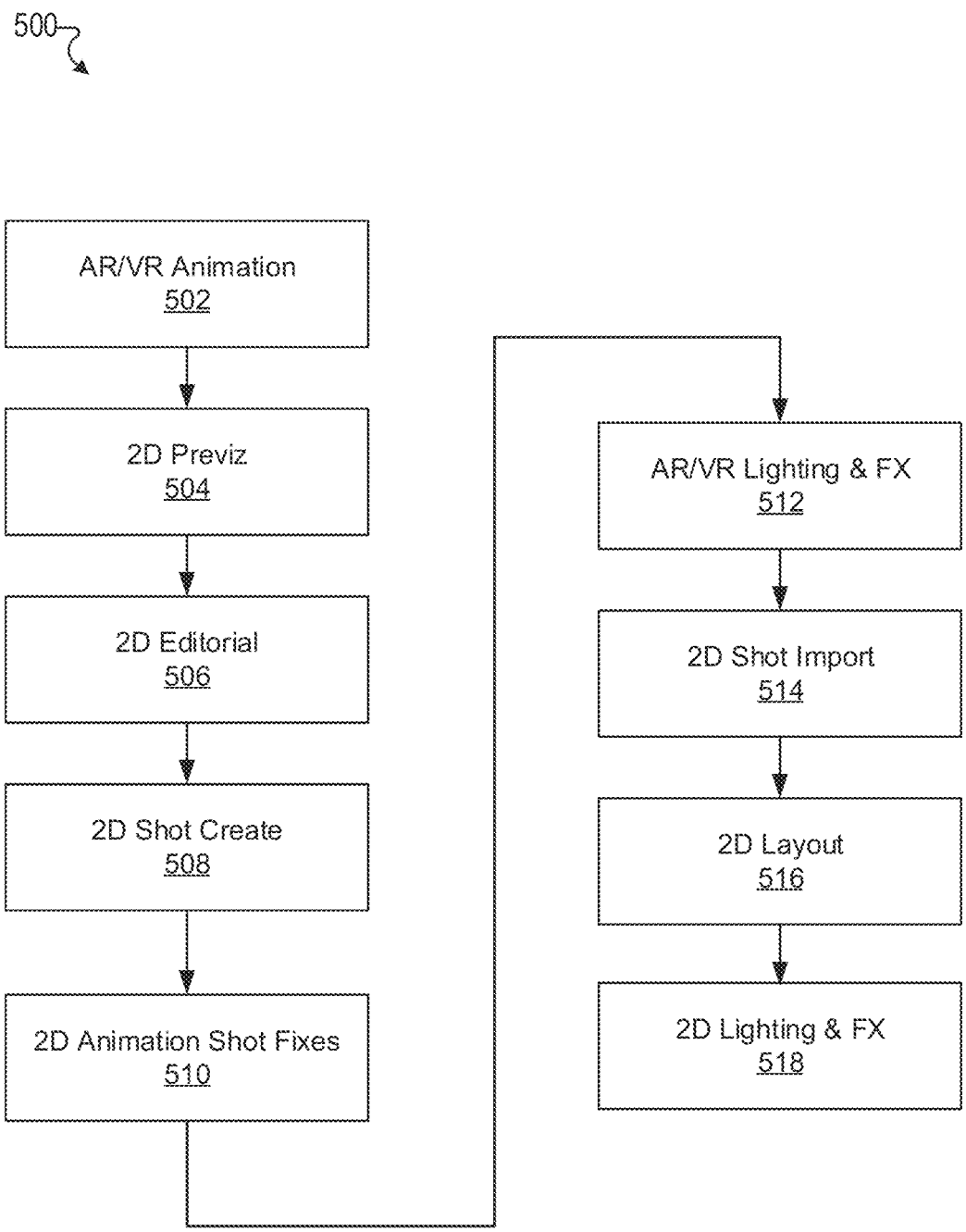
FIGS. 5A-5B illustrate example methods, according to an embodiment of the present technology.

FIG. 5A illustrates an example method 500, according to an embodiment of the present technology. For example, the method 500 can be performed by the system 400 of FIG. 4. At block 502, sequences and shots can be animated for an AR/VR animation or experience in an animation creation tool, as described above in reference to the VR animation module 404. At block 504, virtual cameras can be placed in the animation creation tool, as described above in reference to the 2D previz module 406. At block 506, an edit cut can be produced in non-linear video editing software, as described above in reference to the 2D editorial process 414. At block 508, once the edit cut is approved, 2D shots are created from camera and timing metadata, as described above in reference to the 2D shot create module 408. At block 510, fixes can be applied to 2D shots and additional 2D shots can be created, as described above in reference to the shot fix module 410. At block 512, lighting and FX elements can be created for the AR/VR animation or experience, as described above in reference to the VR lighting & FX module 424. At block 514, 2D shot data can be imported into a real-time engine, as described above in reference to the 2D shot import module 426. At block 516, set dressing and layouts may be applied to shots, as described above in reference to the 2D layout module 428. At block 518, additional lights, shadows, contact shadows, FX elements, and post-processing effects can be applied, as described above in reference to the 2D lighting & FX module 430.

Many variations to the example methods are possible. It should be appreciated that there can be additional, fewer, or alternative steps performed in similar or alternative orders, or in parallel, within the scope of the various embodiments discussed herein unless otherwise stated.

Figure 5B:
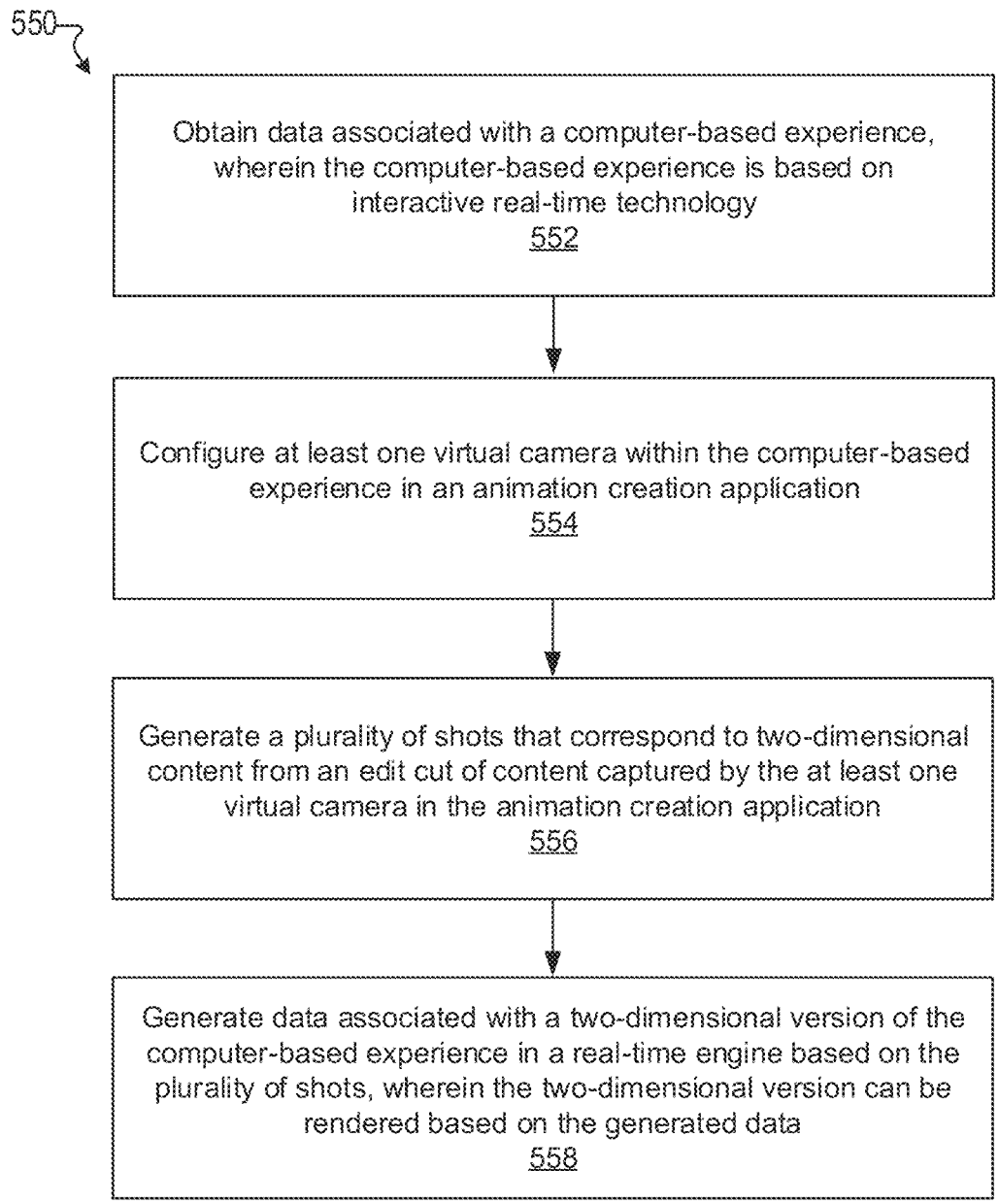

FIG. 5B illustrates an example method 550, according to an embodiment of the present technology. For example, the method 550 can be performed by the system 400 of FIG. 4. At block 552, data associated with a computer-based experience can be obtained. The computer-based experience can be based on interactive real-time technology. For example, the interactive real-time technology can apply augmented reality (AR) and/or or virtual reality (VR) technology to provide interactive content. At block 554, at least one virtual camera can be configured within the computer-based experience in an animation creation application. At block 556, a plurality of shots that correspond to two-dimensional content can be generated from an edit cut of content captured by the at least one virtual camera in the animation creation application. At block 558, data associated with a two-dimensional version of the computer-based experience can be generated in a real-time engine based on the plurality of shots. The two-dimensional version can be rendered based on the generated data.

Many variations to the example methods are possible. It should be appreciated that there can be additional, fewer, or alternative steps performed in similar or alternative orders, or in parallel, within the scope of the various embodiments discussed herein unless otherwise stated.

Figure 10:
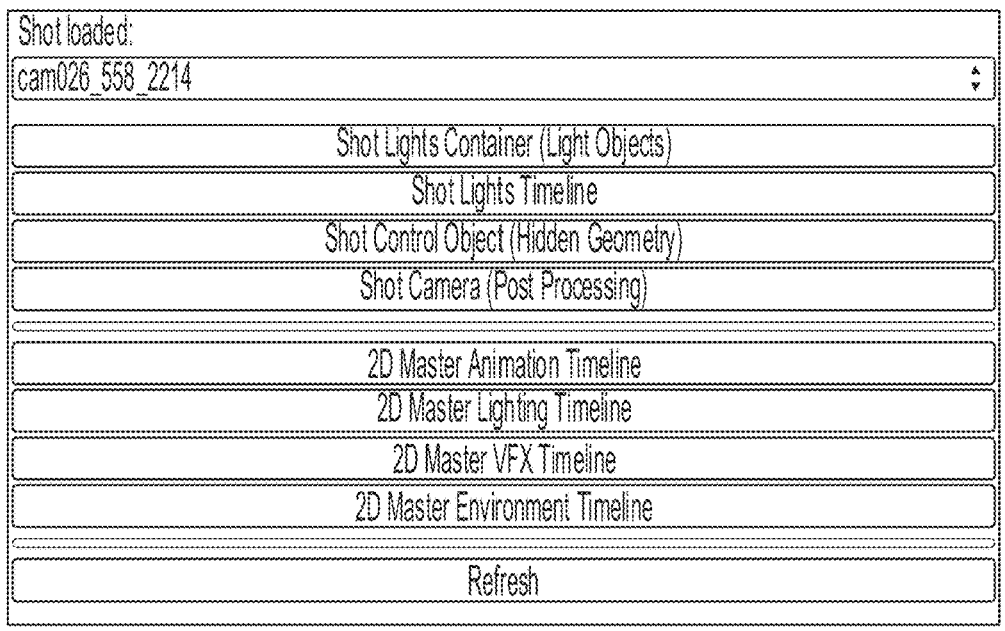

FIG. 10 illustrates an example shot picker interface that can be used to select shots within a real-time engine (e.g., the real-time engine module 212, the real-time engine module 422), according to an embodiment of the present technology. The shot picker interface may be provided by the 2D shot create module 220 or the 2D shot create module 408. The interface can provide a list of all shots available for a given scene. Upon shot selection, the scene can be configured to use the corresponding shot timelines. As a result, an artist is able to scrub the shot in a timeline window of the real-time engine. Additionally, the shot picker interface can provide options for accessing useful workflow objects, such as a component that hides geometry on a per-shot basis and game objects where additive 2D lights exist. Adjustments made to lighting in 2D shots can be additive on top of AR/VR lighting. Further, any changes to the AR/VR lighting will propagate to corresponding 2D shots. In some embodiments, a lighting manager interface can provide options that allow an artist to sever the link between an AR/VR scene and a 2D shot. Once the link is severed, changes to the AR/VR lighting will not propagate to corresponding 2D shots.

Figure 11:
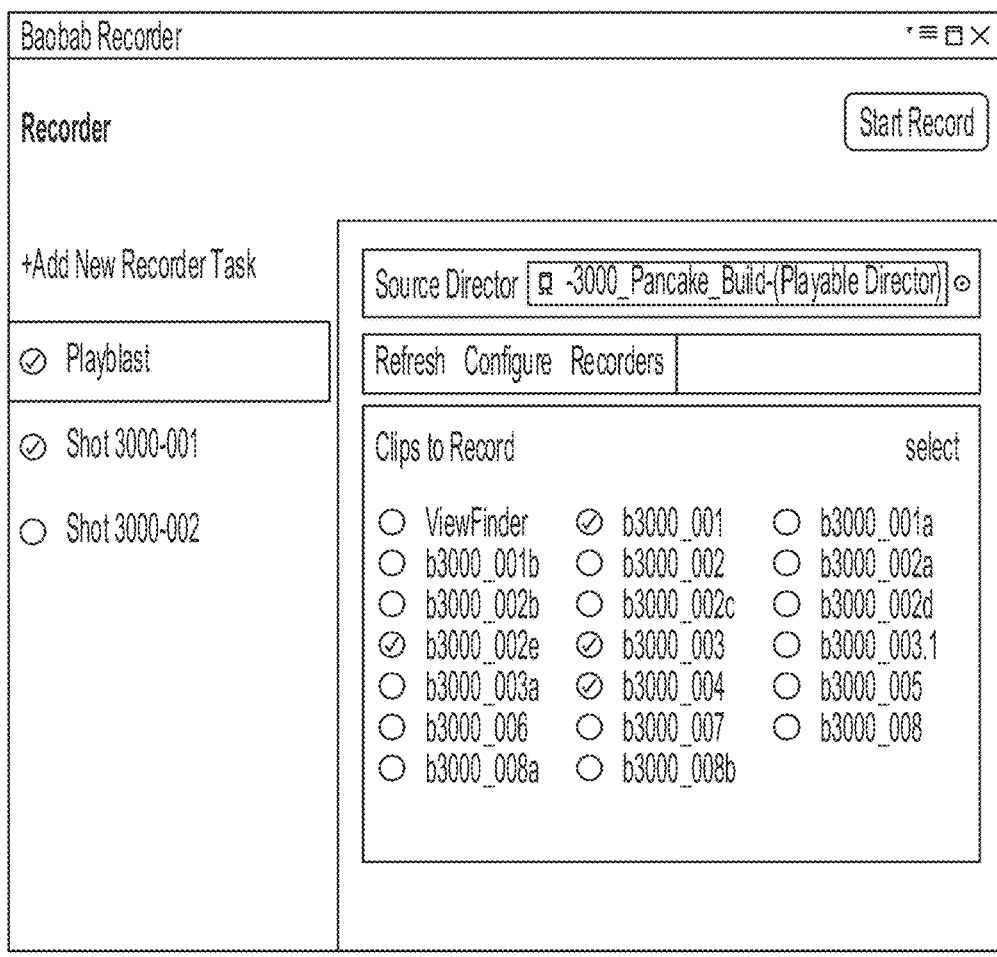

FIG. 11 illustrates an example camera recording interface that can provide options to record shots captured by virtual cameras, according to an embodiment of the present technology. For example, the camera recording interface may be provided by the 2D shot create module 220 or the 2D shot create module 408. The camera recording interface can be customized to record a variety of content with different configurations in a single batch. Further, reticle and slate information can be applied to frames, as described above. In one embodiment, the following information is included: reticle (camera boundaries), sequence, filename, camera lens, camera/shot name, date, and animation frame number.

Figure 12:
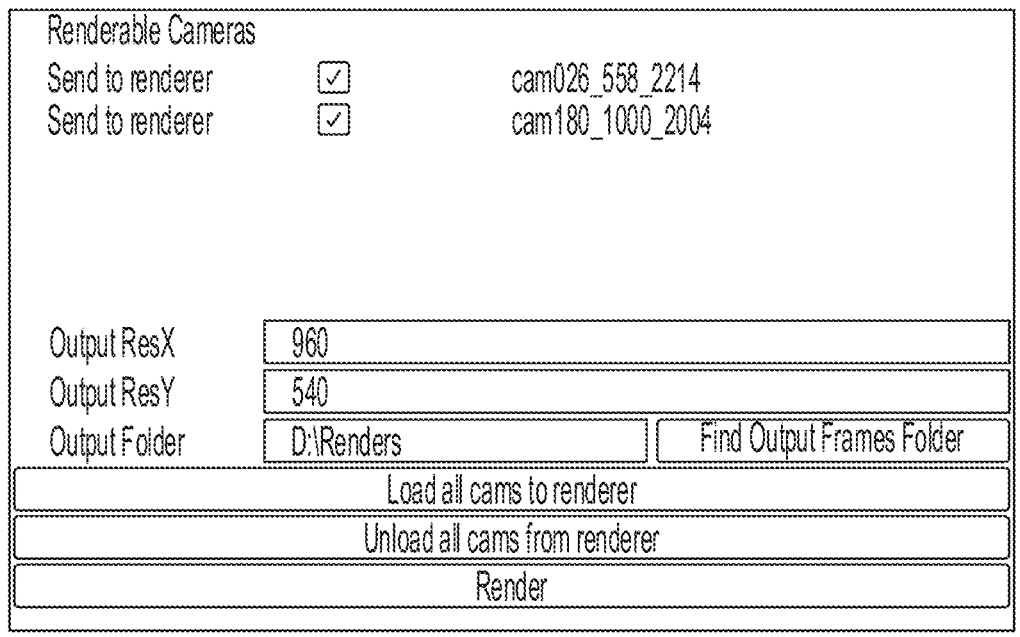

FIG. 12 illustrates a real-time shot renderer interface, according to an embodiment of the present technology. For example, the real-time shot renderer interface may be provided by real-time engine module 212 or the real-time engine module 422. The real-time shot renderer interface can provide options to render out final frames using the real-time engine module 212 and the real-time engine module 422. For example, the real-time shot renderer interface can provide options to render out previz or intermediate frames. In some embodiments, the real-time shot renderer interface can be used in conjunction with the camera recording interface. In such embodiments, the camera recording interface can be used to identify virtual cameras and slate information to be included in frames and the real-time shot renderer interface can be used to render the frames with the slate information. The real-time shot renderer interface can provide options to select different resolutions to render. The real-time shot renderer interface can also provide options to create EXRs and produce multiple render layer passes (e.g., depth, matte, and beauty) for a 2D compositor. In various embodiments, frames can be rendered using the real-time engine module 212 or the real-time engine module 422. In one embodiment, rendering software may activate selected shots and render them one at a time. In one embodiment, the rendering software may render the shots in parallel on one or more remote machines. The rendering can be done in-editor. That is, instead of rendering shots from the build, the rendering software puts the real-time engine module 212 or the real-time engine module 422 into "play-mode" and then proceeds to scrape the shot camera's render texture from shot cameras on a per-frame basis. In an embodiment, the rendering software can operate in conjunction with a recording system built into the real-time engine module 212 or the real-time engine module 422. The rendering can be performed in-editor. In this embodiment, a user can specify recorder clips on a timeline which defines regions of rendering. These clips also define which Arbitrary Output Variables (AOV) are to be rendered. AOVs or render passes provide a way to render any arbitrary shading network component into different images. For example, an artist can render out separate depth, matte, and beauty passed and later recombine them in a compositing process. The chosen AOVs function as additional render passes to a forward render pipeline. Notably, these passes render to user defined render textures instead of to the camera's render texture. The recorders for these passes then write these user defined render textures to disk. To facilitate the compositing process, the AOV passes for a single frame are written into one EXR file, for example, using the SimpleImageIO library.

Figure 13:

FIG. 13 illustrates an example rendered frame. The frame may be rendered by the real-time engine module 212 or the real-time engine module 422. The frame can include metadata information, such as an animation name, sequence, filename, timestamp, an identification number associated with the frame in an animation creation application, and identification number associated with the frame in a real-time engine.

Figure 14:
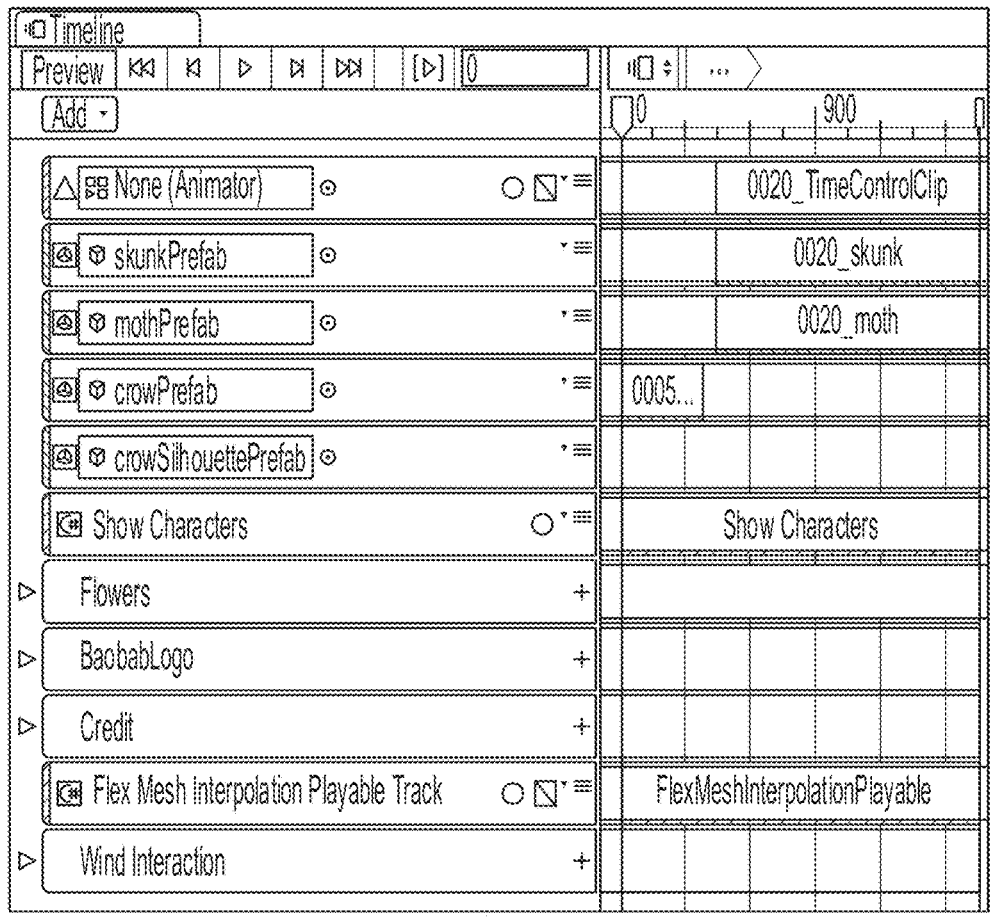

FIG. 14 illustrates a timeline interface that can be used to create additive 2D shot timelines that layer on top of VR master timelines. For example, the timeline interface can be provided by the 2D shot import module 426.

Figure 15:
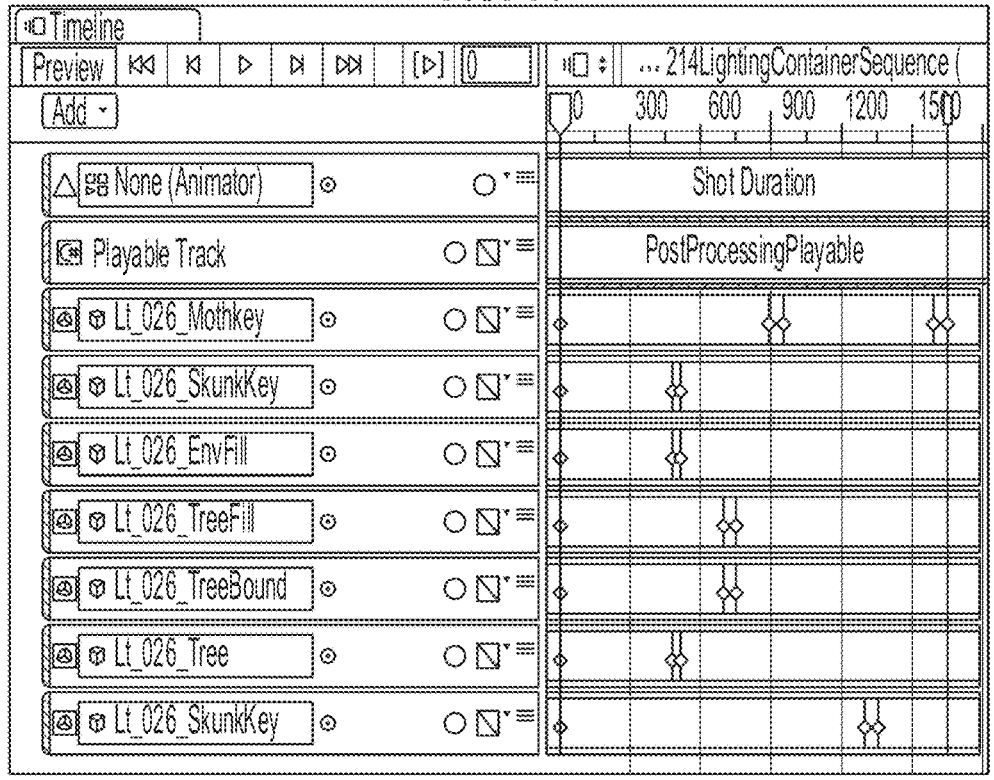

FIG. 15 illustrates another timeline interface that allows lighting artists to make shot-specific additive improvements without having to modify the underlying VR lighting. In some embodiments, making these additive changes does not require re-baking expensive global illumination calculations.

Figure 16:
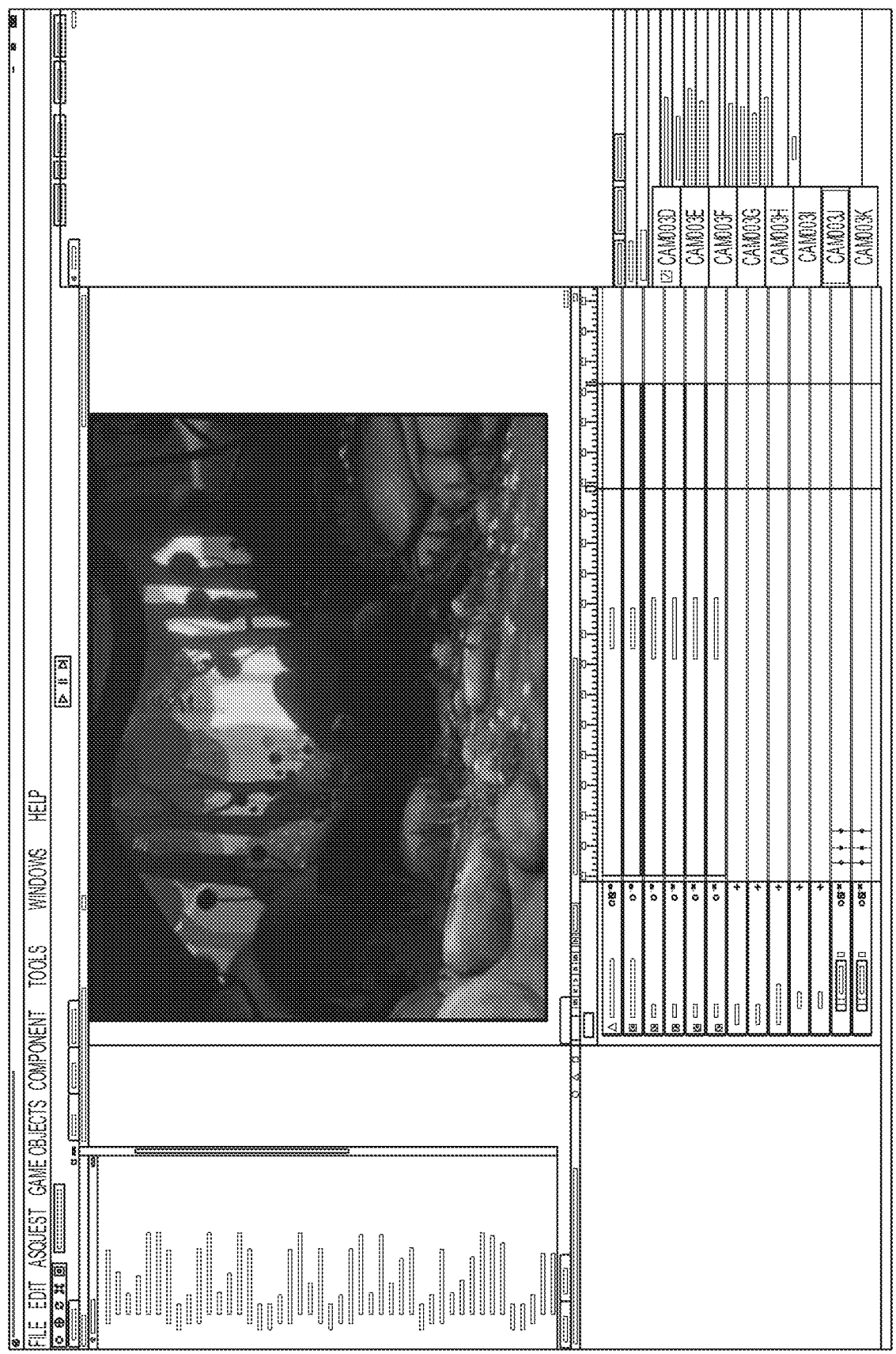

FIG. 16 illustrates a combined lighting interface that incorporates lighting interfaces described above. The combined lighting interface can be provided by the real-time engine module 212 or the real-time engine module 422.

Figure 17:
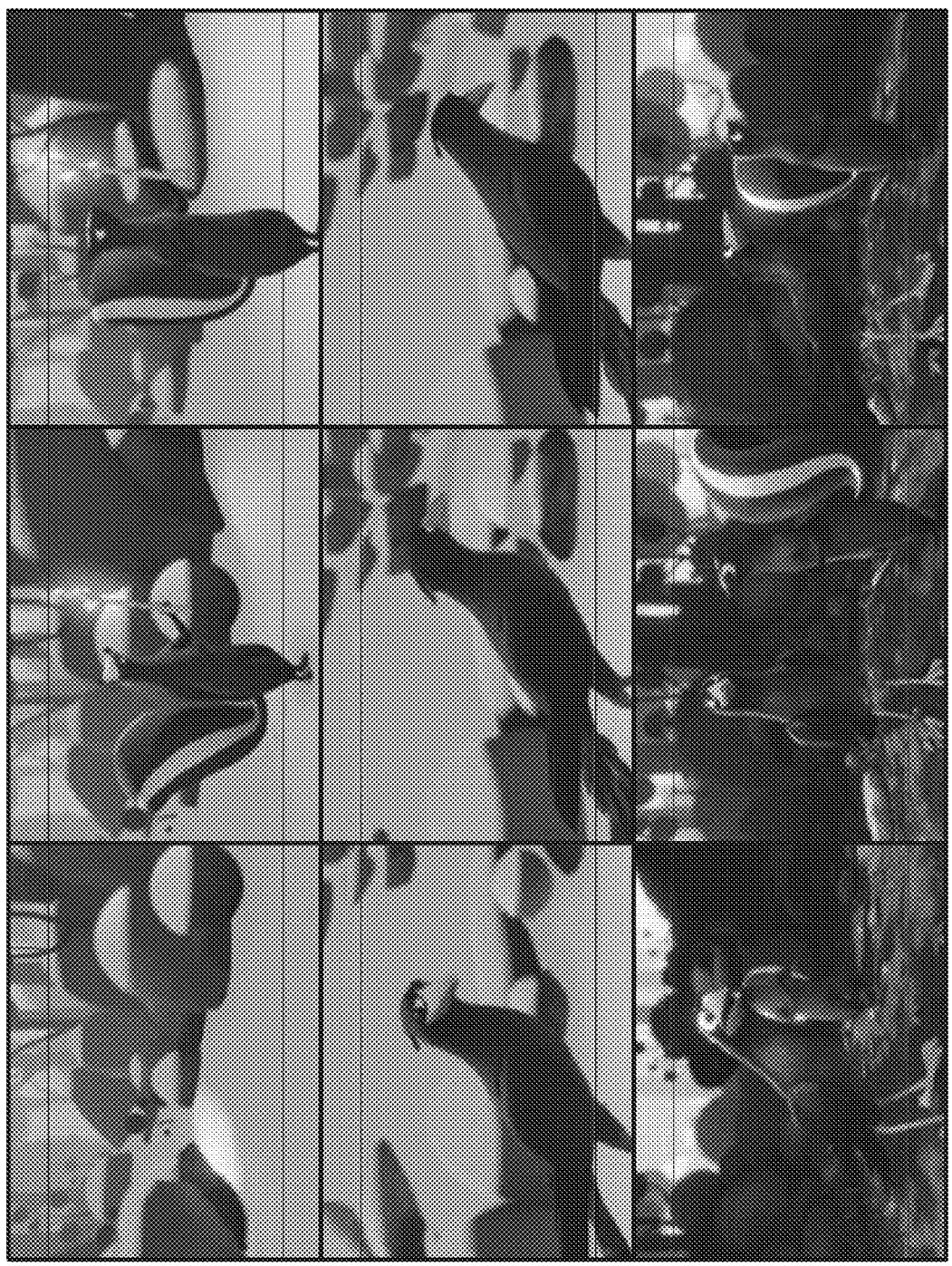

FIG. 17 illustrates an example contact sheet that can be generated based on the present technology. The contact sheet can include frames associated with one or more shots.

Figure 18:
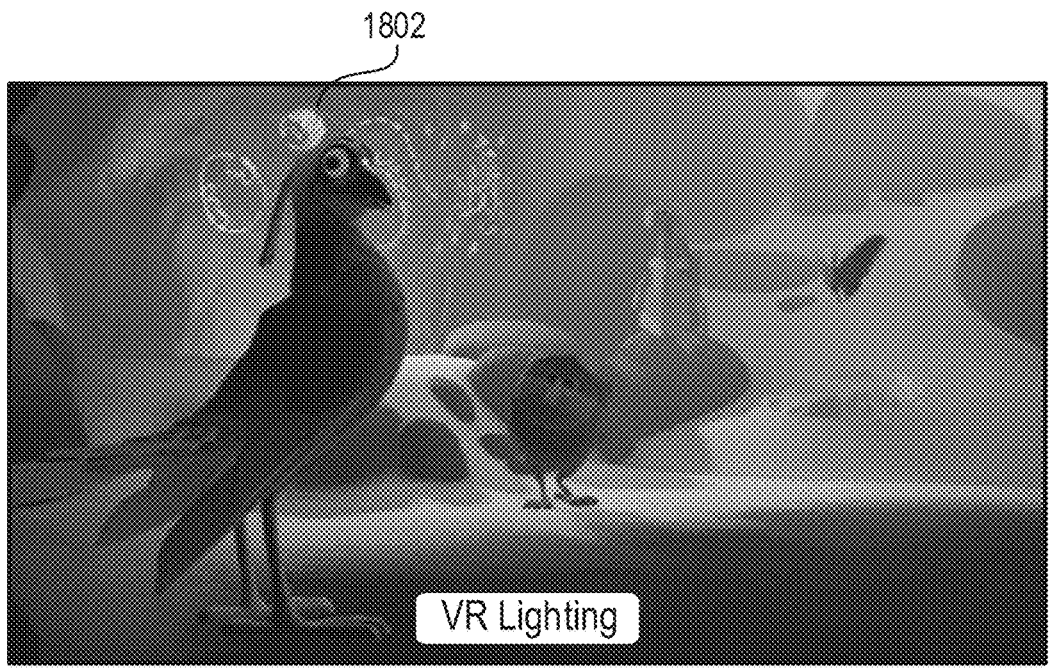
FIGS. 18-24 illustrate various improvements to 2D content derived from AR/VR content, according to embodiments of the present technology.
Figure 19:
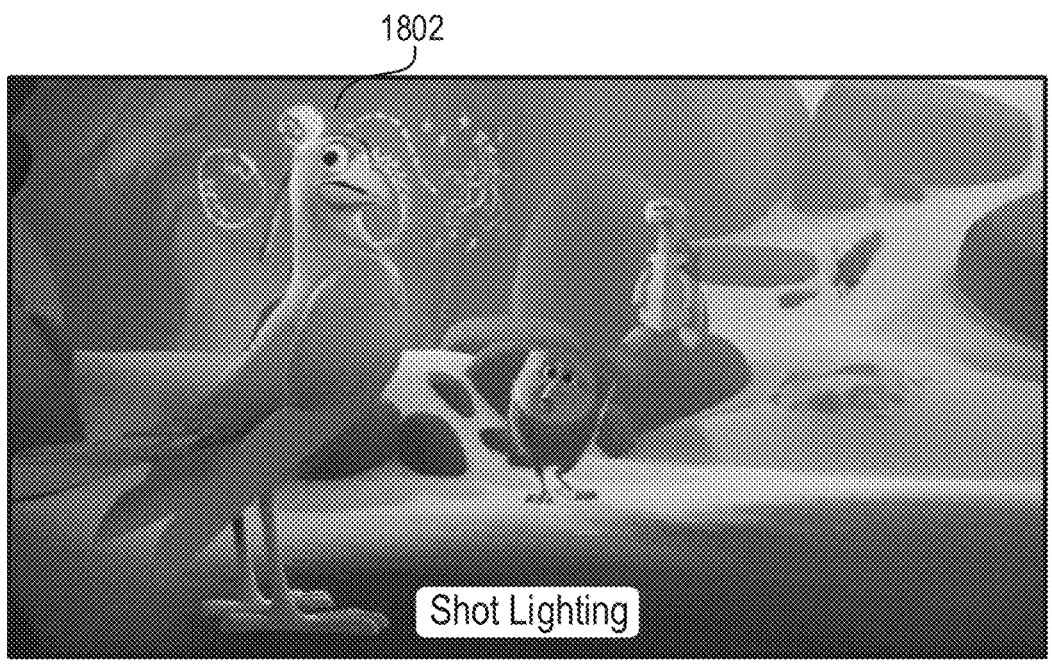
Figure 20:
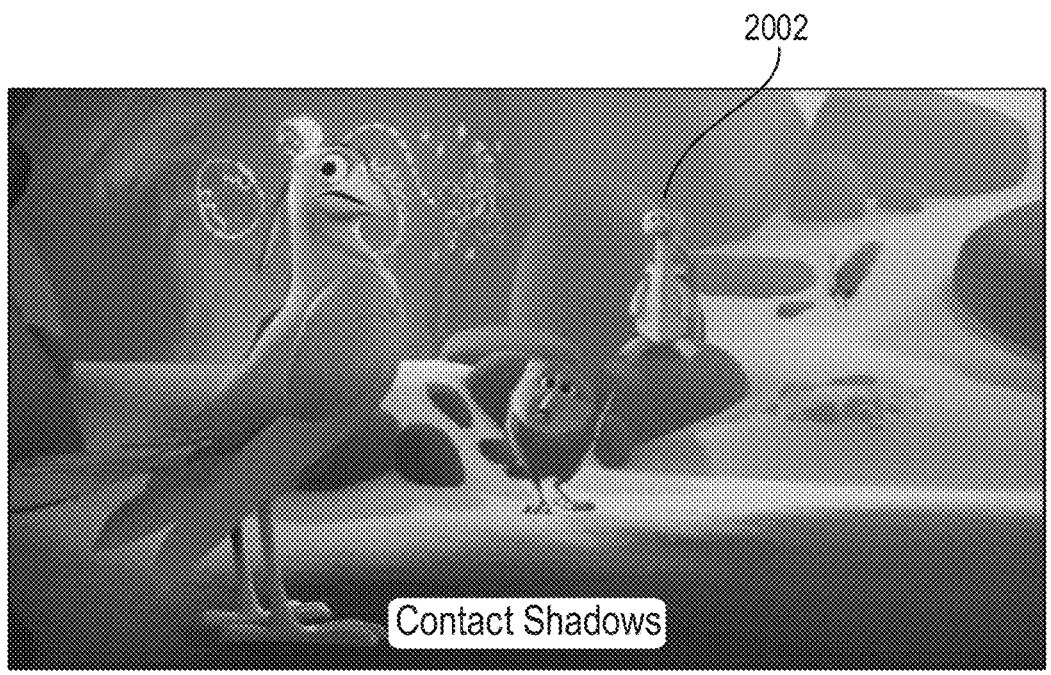
Figure 21:
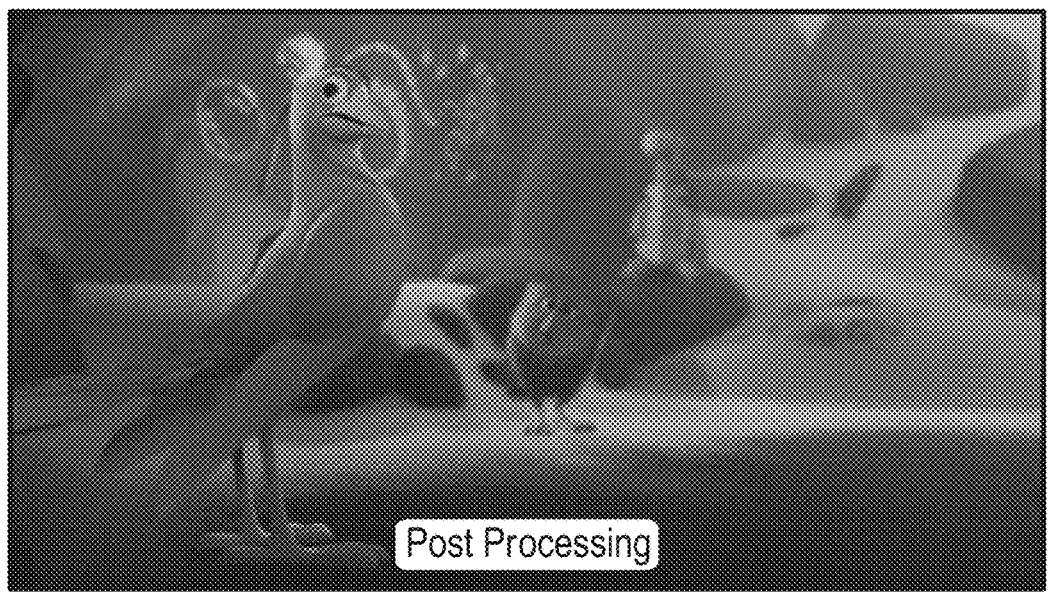
Figure 22:
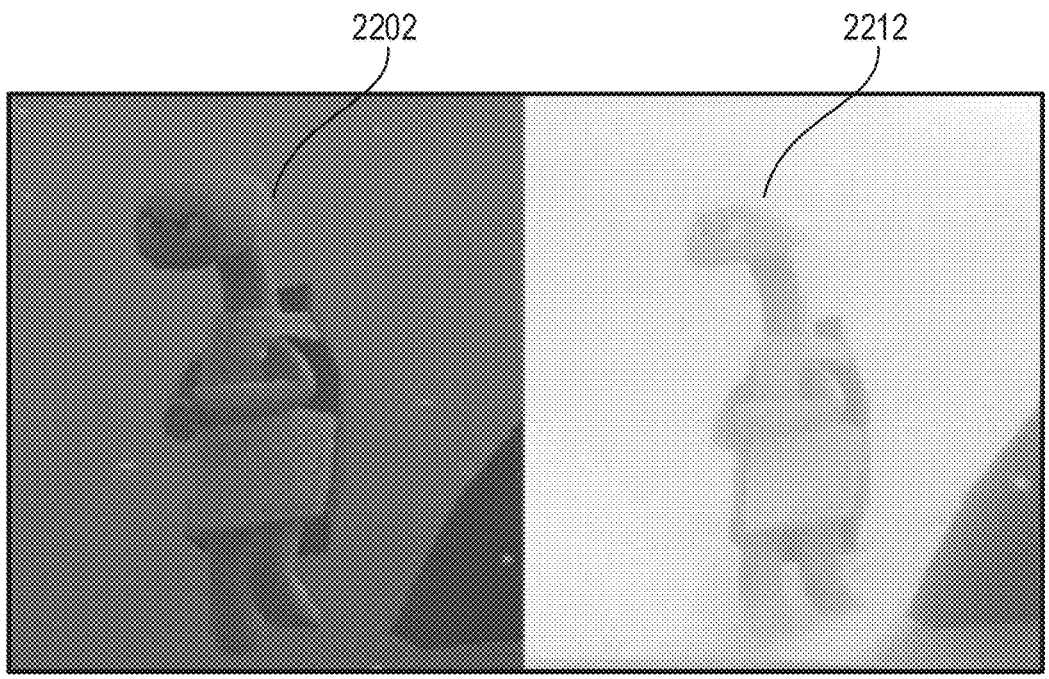
Figure 23:
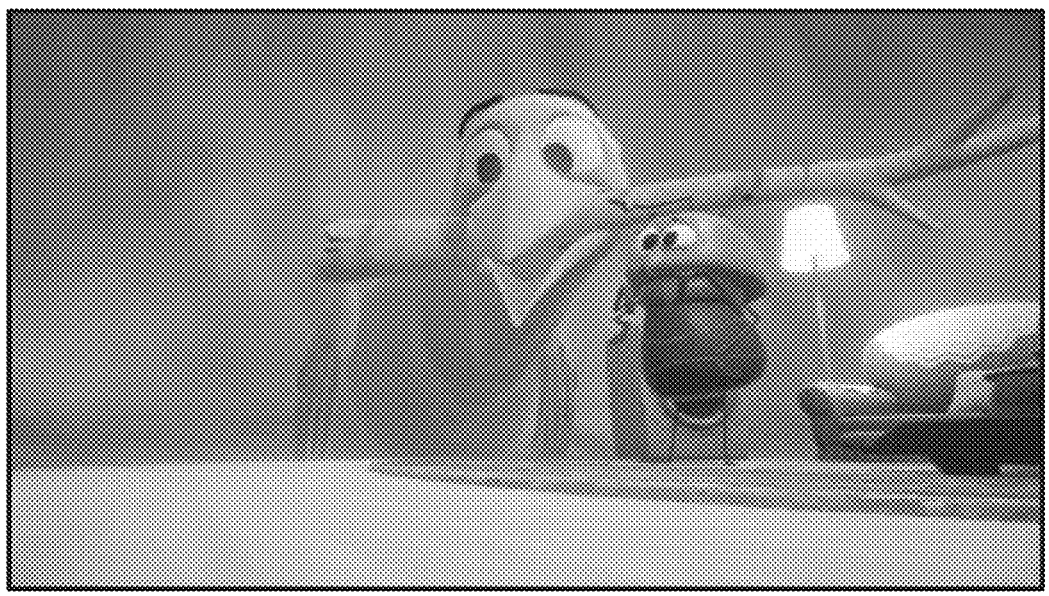
Figure 24:
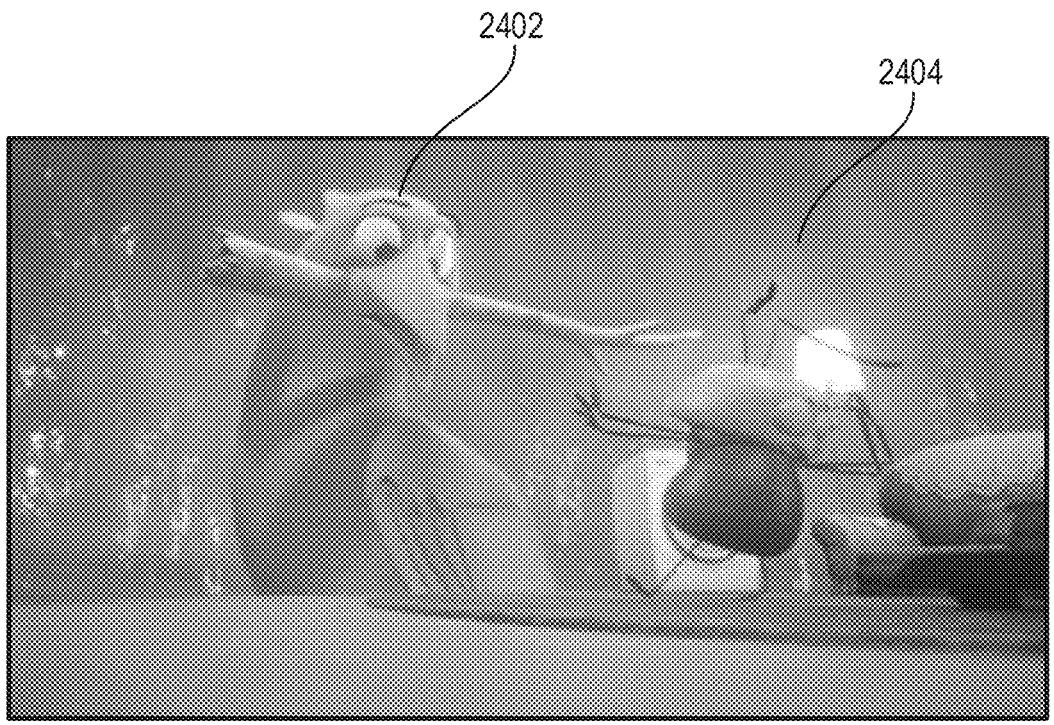

FIGS. 18-24 illustrate various improvements that can be made based on the present technology. For example, the present technology can improve shot lighting in 2D content. In general, lighting for interactive and VR projects often appears correct, but this lighting may not produce intended effects when composed for a specific shot angle. For example, FIG. 18 illustrates 2D content with lighting from an AR/VR version. In this example, a crow character 1802 is intended to be a focal point. However, the lighting from the AR/VR version does not show the crow character 1802 as the focal point. As discussed above, the present technology allows an artist to layer on shot lighting in the 2D content to emphasize the crow character 1802 as the focal point, as illustrated in the example of FIG. 19. The present technology allows an artist to add contact shadows to a turtle character 2002, as illustrated in the example of FIG. 20. Further, the present technology allows an artist to apply post processing (e.g., depth of field) to focus a viewer's attention and to make the shot cinematic, as illustrated in the example of FIG. 21. The present technology also allows an artist to add additional FX elements to 2D content, which would not be suitable for AR/VR content. For example, FIG. 22 illustrates an original shot 2202 from AR/VR content. FIG. 22 also illustrates an improved 2D shot 2212 derived from the original shot 2202. In the improved 2D shot 2212, FX elements corresponding to snow footsteps have been added to ground the turtle character in the environment. The present technology also allows an artist to apply animation fixes to improve 2D content. For example, FIG. 23 illustrates a frame from AR/VR content in which characters are looking at a viewer playing a character in a computer-animated real-time experience. In FIG. 23, the characters are looking at a virtual camera associated with the viewer playing a character in the computer-animated real-time experience. While acceptable for the computer-animated real-time experience, the character behavior reflected in FIG. 23 would not translate to 2D content, since the characters would be looking in the wrong direction. To address this, the present technology allows a new animation to be created and used as 2D content. For example, FIG. 24 illustrates a new animation in which a crow character 2402 is looking at an ant character 2404 while the ant character's 2404 animation hooks up smoothly with the previous shot in FIG. 23. The new animation reflected in FIG. 24 can be better suited for viewing as 2D content than the animation corresponding to the AR/VR content in FIG. 23. Many variations are possible.

Hardware Implementation

Figure 25:
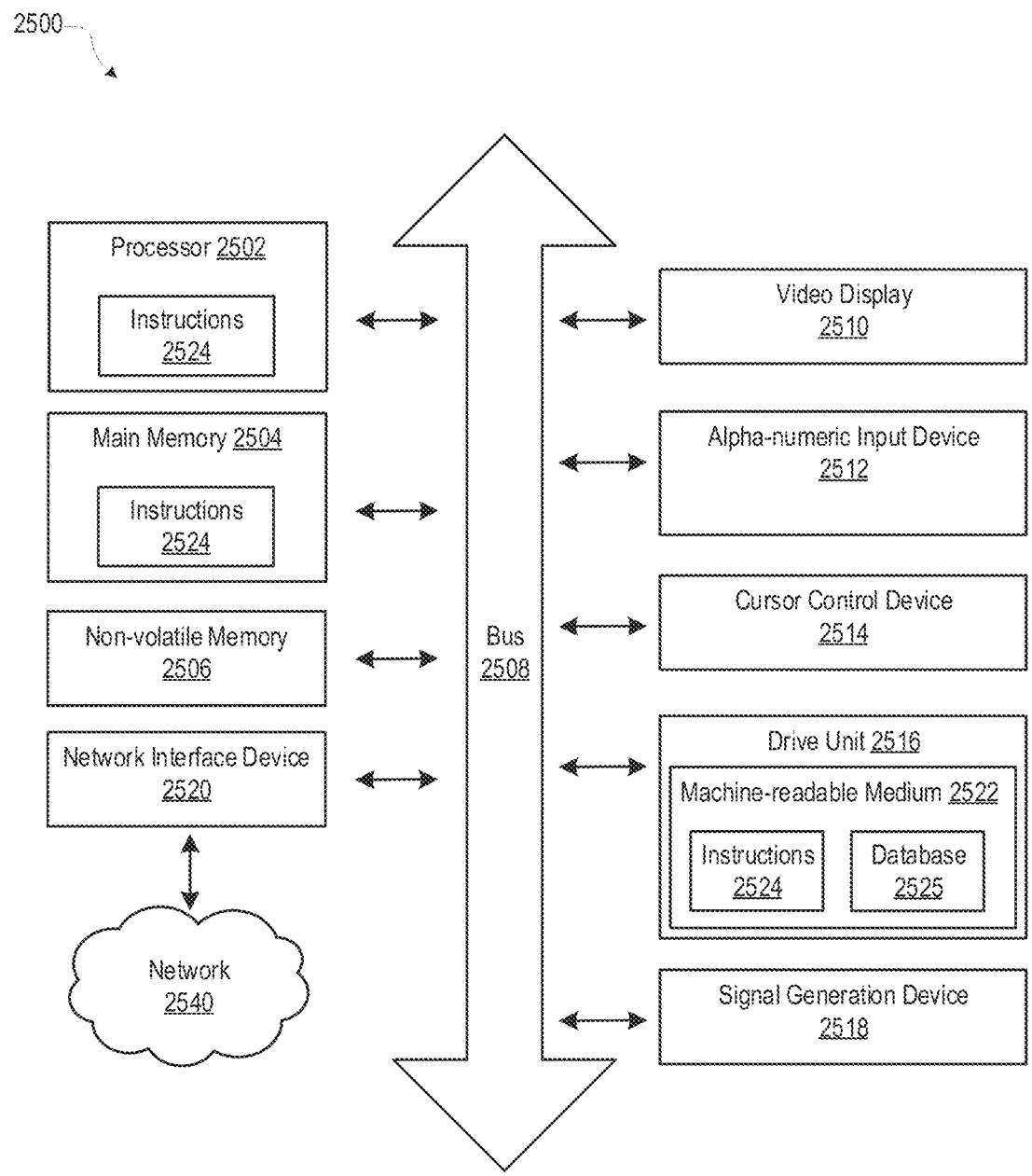
FIG. 25 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 25 illustrates an example machine 2500 within which a set of instructions for causing the machine to perform one or more of the embodiments described herein can be executed, in accordance with an embodiment of the present technology. The embodiments can relate to one or more systems, methods, or computer readable media. The machine may be connected (e.g., networked) to other machines. In a networked deployment, the machine may operate in the capacity of a server or a client machine in a client-server network environment, or as a peer machine in a peer-to-peer (or distributed) network environment.

The computer system 2500 includes a processor 2502 (e.g., a central processing unit (CPU), a graphics processing unit (GPU), or both), a main memory 2504, and a nonvolatile memory 2506 (e.g., volatile RAM and non-volatile RAM, respectively), which communicate with each other via a bus 2508. The processor 2502 can be implemented in any suitable form, such as a parallel processing system. In some cases, the example machine 2500 can correspond to, include, or be included within a computing device or system. For example, in some embodiments, the machine 2500 can be a desktop computer, a laptop computer, personal digital assistant (PDA), an appliance, a wearable device, a camera, a tablet, or a mobile phone, etc. In one embodiment, the computer system 2500 also includes a video display 2510, an alphanumeric input device 2512 (e.g., a keyboard), a cursor control device 2514 (e.g., a mouse), a drive unit 2516, a signal generation device 2518 (e.g., a speaker) and a network interface device 2520.

In one embodiment, the video display 2510 includes a touch sensitive screen for user input. In one embodiment, the touch sensitive screen is used instead of a keyboard and mouse. The disk drive unit 2516 includes a machine-readable medium 2522 on which is stored one or more sets of instructions 2524 (e.g., software) embodying any one or more of the methodologies or functions described herein. The instructions 2524 can also reside, completely or at least partially, within the main memory 2504 and/or within the processor 2502 during execution thereof by the computer system 2500. The instructions 2524 can further be transmitted or received over a network 2540 via the network interface device 2520. In some embodiments, the machine-readable medium 2522 also includes a database 2525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 2506 may also be a random access memory. The non-volatile memory 2506 can be a local device coupled directly to the rest of the components in the computer system 2500. A non-volatile memory that is remote from the system, such as a network storage device coupled to any of the computer systems described herein through a network interface such as a modem or Ethernet interface, can also be used.

While the machine-readable medium 2522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 2500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a set of two-dimensional content paths associated with an interactive version of a computer-based experience;
   configuring, by the computing system, at least one virtual camera within the computer-based experience in a real-time engine;
   generating, by the computing system, sets of shots for a non-interactive version of the computer-based experience that correspond to a two-dimensional content path of the set of two-dimensional content paths based on content captured by the at least one virtual camera within the computer-based experience;
   determining, by the computing system, at least one set of shots to be bi-furcated for adjustments to the non-interactive version of the computer-based experience based on a visual quality associated with the at least one set of shots; and
   generating, by the computing system, at least one new set of shots to replace the at least one set of shots based on the interactive version of the computer-based experience.

2. The method of claim 1, wherein the at least one virtual camera is configured based on a script for a two-dimensional film, and wherein the sets of shots that correspond to the two-dimensional content path are associated with camera angles based on the script.

3. The method of claim 1, further comprising:
   receiving, by the computing system, input associated with a hand controller, wherein the at least one virtual camera is configured within the computer-based experience based on the input.

4. The method of claim 1, further comprising:
   determining, by the computing system, an update to the at least one set of shots; and
   determining, by the computing system, at least one set of update shots based on the update, wherein the at least one set of update shots includes overlapping shots.

5. The method of claim 1, further comprising:
   determining, by the computing system, an update to the interactive version of a computer-based experience; and
   propagating, by the computing system, the update to the at least one set of shots for the non-interactive version of the computer-based experience.

6. The method of claim 1, further comprising:
   receiving, by the computing system, information associated with an edit to be applied to the at least one set of shots;
   editing, by the computing system, an asset in the interactive version of the computer-based experience based on the information; and
   applying, by the computing system, the edit to the at least one set of shots based on the edited asset.

7. The method of claim 1, further comprising:
   providing, by the computing system, an overlay for the at least one set of shots, wherein the overlay includes at least one of: reticle data, sequence data, a filename, camera lens information, a camera name, a shot name, a timestamp, a take number, an iteration number, or an animation frame number.

8. The method of claim 1, wherein the at least one set of shots for the non-interactive version of the computer-based experience replaces existing shots associated with the interactive version of a computer-based experience.

9. The method of claim 1, wherein the set of two-dimensional content paths represent branches of a story associated with the computer-based experience.

10. The method of claim 1, wherein the at least one set of shots is associated with shot metadata information comprising at least one of: a shot name, a duration, an animation file, a frame range, an included character, or a publish version.

11. A system comprising:
at least one processor; and
a memory storing instructions that, when executed by the at least one processor, cause the system to perform operations comprising:
- generating a set of two-dimensional content paths associated with an interactive version of a computer-based experience;
- configuring at least one virtual camera within the computer-based experience in a real-time engine;
- generating sets of shots for a non-interactive version of the computer-based experience that correspond to a two-dimensional content path of the set of two-dimensional content paths based on content captured by the at least one virtual camera within the computer-based experience;
- determining at least one set of shots to be bi-furcated for adjustments to the non-interactive version of the computer-based experience based on a visual quality associated with the at least one set of shots; and
- generating at least one new set of shots to replace the at least one set of shots based on the interactive version of the computer-based experience.

12. The system of claim 11, wherein the at least one virtual camera is configured based on a script for a two-dimensional film, and wherein the sets of shots that correspond to the two-dimensional content path are associated with camera angles based on the script.

13. The system of claim 11, the operations further comprising:
- receiving input associated with a hand controller, wherein the at least one virtual camera is configured within the computer-based experience based on the input.

14. The system of claim 11, the operations further comprising:
- determining an update to the at least one set of shots; and
- determining at least one set of update shots based on the update, wherein the at least one set of update shots includes overlapping shots.

15. The system of claim 11, the operations further comprising:
- determining an update to the interactive version of a computer-based experience; and
- propagating the update to the at least one set of shots for the non-interactive version of the computer-based experience.

16. A non-transitory computer-readable storage medium including instructions that, when executed by at least on processor of a computing system, cause the computing system to perform operations comprising:
- generating a set of two-dimensional content paths associated with an interactive version of a computer-based experience;
- configuring at least one virtual camera within the computer-based experience in a real-time engine;
- generating sets of shots for a non-interactive version of the computer-based experience that correspond to a two-dimensional content path of the set of two-dimensional content paths based on content captured by the at least one virtual camera within the computer-based experience;
- determining at least one set of shots to be bi-furcated for adjustments to the non-interactive version of the computer-based experience based on a visual quality associated with the at least one set of shots; and
- generating at least one new set of shots to replace the at least one set of shots based on the interactive version of the computer-based experience.

17. The non-transitory computer-readable storage medium of claim 16, wherein the at least one virtual camera is configured based on a script for a two-dimensional film, and wherein the sets of shots that correspond to the two-dimensional content path are associated with camera angles based on the script.

18. The non-transitory computer-readable storage medium of claim 16, the operations further comprising:
- receiving input associated with a hand controller, wherein the at least one virtual camera is configured within the computer-based experience based on the input.

19. The non-transitory computer-readable storage medium of claim 16, the operations further comprising:
- determining an update to the at least one set of shots; and
- determining at least one set of update shots based on the update, wherein the at least one set of update shots includes overlapping shots.

20. The non-transitory computer-readable storage medium of claim 16, the operations further comprising:
- determining an update to the interactive version of a computer-based experience; and
- propagating the update to the at least one set of shots for the non-interactive version of the computer-based experience.

* * * * *